United States Patent
Inoue et al.

(10) Patent No.: US 10,944,121 B2
(45) Date of Patent: Mar. 9, 2021

(54) POLYMER ELECTROLYTE FILM

(71) Applicants: ASAHI KASEI KABUSHIKI KAISHA, Tokyo (JP); DAIKIN INDUSTRIES, LTD., Osaka (JP)

(72) Inventors: Yuichi Inoue, Tokyo (JP); Kuon Miyazaki, Tokyo (JP); Kentaro Kikuchi, Tokyo (JP); Nobuki Uraoka, Settsu (JP); Shinichi Chaen, Settsu (JP); Tomohisa Konishi, Settsu (JP); Tadashi Ino, Settsu (JP)

(73) Assignees: ASAHI KASEI KABUSHIKI KAISHA, Tokyo (JP); DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/100,048

(22) PCT Filed: Dec. 1, 2014

(86) PCT No.: PCT/JP2014/081779
§ 371 (c)(1),
(2) Date: May 27, 2016

(87) PCT Pub. No.: WO2015/080292
PCT Pub. Date: Jun. 4, 2015

(65) Prior Publication Data
US 2017/0005354 A1    Jan. 5, 2017

(30) Foreign Application Priority Data

Nov. 29, 2013 (JP) .............................. JP2013-248728

(51) Int. Cl.
*H01M 8/1044* (2016.01)
*H01M 8/1039* (2016.01)
(Continued)

(52) U.S. Cl.
CPC .......... *H01M 8/1044* (2013.01); *B01D 69/02* (2013.01); *B01D 71/32* (2013.01); *B01D 71/82* (2013.01);
(Continued)

(58) Field of Classification Search
None
See application file for complete search history.

(56) References Cited

U.S. PATENT DOCUMENTS 5,234,739 A    8/1993  Tanaru et al.
5,547,551 A    8/1996  Bahar et al.
(Continued)

FOREIGN PATENT DOCUMENTS

CN    1072351 A    5/1993
CN    1033428 C    12/1996
(Continued)

OTHER PUBLICATIONS

JPH08162132 Original & Translation from Espacenet. (Year: 1996).*
(Continued)

*Primary Examiner* — Barbara L Gilliam
*Assistant Examiner* — Nathanael T Zemui
(74) *Attorney, Agent, or Firm* — Sughrue Mion, PLLC

(57) ABSTRACT

The present invention provides a polymer electrolyte membrane having excellent strength, a small dimensional change, and a low membrane resistance. The polymer electrolyte membrane includes a porous film having pores and a polymer electrolyte contained in the pores. The porous film is obtained by copolymerizing tetrafluoroethylene and an ethylenic comonomer to provide polytetrafluoroethylene and then stretching the polytetrafluoroethylene. The porous film has an average pore size of greater than 0.20 μm.

8 Claims, 1 Drawing Sheet

(51) Int. Cl.
| | |
|---|---|
| H01B 1/12 | (2006.01) |
| C08J 5/22 | (2006.01) |
| B01D 71/32 | (2006.01) |
| B01D 71/82 | (2006.01) |
| B01D 69/02 | (2006.01) |
| H01M 8/1025 | (2016.01) |
| H01M 8/1018 | (2016.01) |

(52) U.S. Cl.
CPC ............ *C08J 5/2237* (2013.01); *H01B 1/122* (2013.01); *H01M 8/1025* (2013.01); *H01M 8/1039* (2013.01); *B01D 2323/42* (2013.01); *B01D 2325/14* (2013.01); *C08J 2327/18* (2013.01); *C08J 2427/12* (2013.01); *H01M 2008/1095* (2013.01); *H01M 2300/0082* (2013.01)

(56) References Cited

U.S. PATENT DOCUMENTS

| | | | |
|---|---|---|---|
| 5,795,668 | A | 8/1998 | Banerjee |
| 5,945,192 | A | 8/1999 | Kato et al. |
| 6,054,230 | A | 4/2000 | Kato |
| 6,177,533 | B1 | 1/2001 | Woodward |
| 6,541,589 | B1 | 4/2003 | Baillie |
| 7,670,720 | B1 | 3/2010 | Buerger et al. |
| 2002/0161149 | A1 | 10/2002 | Kobayashi et al. |
| 2003/0008198 | A1* | 1/2003 | Mukoyama ............ C08J 5/2275 429/483 |
| 2005/0025684 | A1 | 2/2005 | Jethrow et al. |
| 2005/0186461 | A1* | 8/2005 | Hommura ............ H01B 1/122 429/483 |
| 2006/0068258 | A1* | 3/2006 | Kinoshita ............ H01M 4/926 429/483 |
| 2007/0009727 | A1 | 1/2007 | Sawada et al. |
| 2007/0135558 | A1 | 6/2007 | Tsuda et al. |
| 2008/0083499 | A1* | 4/2008 | Nodono ............ B32B 37/0007 156/324 |
| 2008/0200571 | A1* | 8/2008 | Higuchi ............ C08F 2/26 521/65 |
| 2009/0234032 | A1 | 9/2009 | Kimishima |
| 2009/0246592 | A1 | 10/2009 | Kinoshita |
| 2009/0281231 | A1* | 11/2009 | Kasai ............ C08F 14/26 524/546 |
| 2010/0160510 | A1* | 6/2010 | Aten ............ C08F 14/18 524/131 |
| 2011/0008708 | A1 | 1/2011 | Akita et al. |
| 2011/0020728 | A1 | 1/2011 | Kita et al. |
| 2011/0027688 | A1* | 2/2011 | Hommura ............ C08F 214/182 429/483 |
| 2011/0039960 | A1 | 2/2011 | Xu et al. |
| 2011/0040054 | A1 | 2/2011 | Higuchi et al. |
| 2012/0028046 | A1 | 2/2012 | Ono et al. |
| 2013/0040142 | A1 | 2/2013 | Frey et al. |
| 2013/0172477 | A1* | 7/2013 | Hintzer ............ C08F 214/262 524/544 |
| 2013/0183515 | A1 | 7/2013 | White |
| 2013/0267621 | A1 | 10/2013 | Sawada et al. |
| 2013/0281558 | A1 | 10/2013 | Sawada et al. |
| 2014/0200310 | A1 | 7/2014 | Taira et al. |
| 2014/0343239 | A1 | 11/2014 | Higuchi et al. |
| 2015/0082757 | A1 | 3/2015 | Chaen et al. |
| 2015/0299341 | A1 | 10/2015 | Nanba |
| 2016/0289361 | A1 | 10/2016 | Yamanaka et al. |
| 2017/0001155 | A1 | 1/2017 | Chaen et al. |
| 2017/0002156 | A1 | 1/2017 | Chaen et al. |
| 2017/0012313 | A1 | 1/2017 | Inoue et al. |

FOREIGN PATENT DOCUMENTS

| | | |
|---|---|---|
| CN | 1351088 A | 5/2002 |
| CN | 1685548 A | 10/2005 |
| CN | 101771153 A | 7/2010 |
| CN | 104884476 A | 9/2015 |
| EP | 0 661 336 A1 | 7/1995 |
| EP | 1 560 284 A1 | 8/2005 |
| EP | 3 061 512 A1 | 8/2016 |
| JP | 5-202217 A | 8/1993 |
| JP | H08162132 * | 6/1996 |
| JP | 96/28242 A1 | 9/1996 |
| JP | 11-501961 A | 2/1999 |
| JP | 11-240917 A | 9/1999 |
| JP | 2000-143727 A | 5/2000 |
| JP | 2002-201217 A | 7/2002 |
| JP | 3552686 B2 | 8/2004 |
| JP | 2005-520002 A | 7/2005 |
| JP | 2006-49002 A | 2/2006 |
| JP | 2006-504848 A | 2/2006 |
| JP | 2008-512551 A | 4/2008 |
| JP | 4402625 B2 | 1/2010 |
| JP | 2010-58026 A | 3/2010 |
| JP | 4951970 B2 | 6/2012 |
| WO | 96/28501 A1 | 9/1996 |
| WO | 03/022912 A2 | 3/2003 |
| WO | 03/033555 A1 | 4/2003 |
| WO | 2004/041529 A1 | 5/2004 |
| WO | 2005/042593 A1 | 5/2005 |
| WO | 2005/061567 A1 | 7/2005 |
| WO | 2006/031456 A1 | 3/2006 |
| WO | 2007/005361 A1 | 1/2007 |
| WO | 2007/011492 A1 | 1/2007 |
| WO | 2007/024762 A2 | 3/2007 |
| WO | 2007/046345 A1 | 4/2007 |
| WO | 2007/069714 A1 | 6/2007 |
| WO | 2009/001894 A1 | 12/2008 |
| WO | 2009/116446 A1 | 9/2009 |
| WO | 2009/142080 A1 | 11/2009 |
| WO | 2010076661 A1 | 7/2010 |
| WO | 2010/098135 A1 | 9/2010 |
| WO | 2010/110851 A2 | 9/2010 |
| WO | 2010/113950 A1 | 10/2010 |
| WO | 2012/033804 A1 | 3/2012 |
| WO | 2013/027850 A1 | 2/2013 |
| WO | 2013/115278 A1 | 8/2013 |
| WO | 2013/157647 A1 | 10/2013 |

OTHER PUBLICATIONS

International Search Report dated Mar. 3, 2015 from the International Searching Authority in counterpart International Application No. PCT/JP2014/081795.

International Search Report dated Mar. 3, 2015 from the International Searching Authority in counterpart International Application No. PCT/JP2014/081771.

International Search Report dated Mar. 10, 2015 from the International Searching Authority in counterpart International Application No. PCT/JP2014/081775.

International Search Report dated Mar. 10, 2015 from the International Searching Authority in counterpart International Application No. PCT/JP2014/081777.

International Preliminary Report on Patentability dated Jun. 28, 2016 from the International Bureau in counterpart International Application No. PCT/JP2014/081795.

International Preliminary Report on Patentability dated May 31, 2016 from the International Bureau in counterpart International Application No. PCT/JP2014/081779.

International Preliminary Report on Patentability dated May 31, 2016 from the International Bureau in counterpart International Application No. PCT/JP2014/081771.

International Preliminary Report on Patentability dated May 31, 2016 from the International Bureau in counterpart International Application No. PCT/JP2014/081775.

International Preliminary Report on Patentability dated May 31, 2016 from the International Bureau in counterpart International Application No. PCT/JP2014/081777.

Communication dated Aug. 11, 2017, issued by the United States and Trademark Office in co-pendingt U.S. Appl. No. 15/100,010.

Communication dated May 22, 2017 from the European Patent Office in counterpart Application No. 14866220.8.

(56) References Cited

OTHER PUBLICATIONS

Communication dated May 24, 2017 from the European Patent Office in counterpart Application No. 14865899.0.
Communication dated Jun. 2, 2017 from the European Patent Office in counterpart Application No. 14865549.1.
Hongwei Zhang, et al.; "Recent Development of Polymer Electrolyte Membranes for Fuel Cells"; Chemical Reviews; vol. 112, No. 5, May 9, 2012; pp. 2780-2832; XP055375431.
Pattabiraman Krishnamurthy et al.; "Performance of a 1kW Class Nafion-PTFE Composite Membrane Fuel Stack"; International Journal of Chemical Engineering, vol. 2012, Article ID 512803; pp. 1-8.
Michael Wikol et al.; "Expanded Polytetrafluoroethylene Membranes and Their Applications"; Extracted from Filtration and Purification in the Biopharmaceutical Industry, Second Edition; W.L. Gore & Associates, Inc.; Chapter 23, pp. 619-640 (Feb. 2008).
Xinmin Hao et al.; "Studies on Porous and Morphological Structures of Expanded PTFE Membrane Through Biaxial Stretching Technique"; INJ Summer 2005; pp. 31-38.
Database WPI, Week 200572; Thomas Scientific, London, GB, XP-002768565 & WO 2005/090480 (4 pages total) Sep. 29, 2005.
Communication dated Apr. 7, 2017, from the European Patent Office in counterpart European Application No. 14865872.7.
Communication dated Apr. 19, 2017, from the European Patent Office in counterpart European Application No. 14865651.5.
International Search Report of PCT/JP2014/081779 dated Feb. 24, 2015.
Communication dated Jan. 23, 2018 from the U.S. Patent and Trademark Office in counterpart U.S. Appl. No. 15/038,307.
Final Office Action dated Apr. 19, 2018 from the United States Patent and Trademark Office in related U.S. Appl. No. 15/100,010.
Office Action dated May 15, 2018, which issued during the prosecution of U.S. Appl. No. 15/038,307.
Office Action dated May 31, 2018, which issued during the prosecution of U.S. Appl. No. 15/100,002.
Communication dated Jan. 31, 2019 from the United States Patent and Trademark Office in U.S. Appl. No. 15/100,013.
Communication dated Feb. 6, 2019 from the United States Patent and Trademark Office in U.S. Appl. No. 15/100,002.
Communication dated Jul. 10, 2019 from the United States Patent and Trademark Office of co-pending U.S. Appl. No. 15/100,013.
Communication dated Jul. 16, 2019 from the United States Patent and Trademark Office of co-pending U.S. Appl. No. 15/038,307.
Communication dated Jul. 10, 2019 from the United States Patent and Trademark Office of co-pending U.S. Appl. No. 15/100,002.
Communication dated Dec. 17, 2018 from the United States Patent and Trademark Office in U.S. Appl. No. 15/038,307.
Communication dated Nov. 16, 2018, from United States Patent and Trademark Office in related U.S. Appl. No. 15/100,010.
Communication dated May 30, 2019 from the United States Patent and Trademark Office in U.S. Appl. No. 15/100,010.
Notice of Allowance dated Nov. 19, 2019 issued in U.S. Appl. No. 15/100,010.
Office Action dated Dec. 4, 2019 issued in U.S. Appl. No. 15/038,307.
Communication dated Oct. 17, 2019 from the United States Patent and Trademark Office in Counterpart U.S. Appl. No. 15/100,013.
Notice of Allowance and Fee(s) Due dated Apr. 1, 2020 from the United States Patent and Trademark Office in related U.S. Appl. No. 15/100,002.
Final Office Action dated Jul. 14, 2020 from the United States Patent and Trademark Office in related U.S. Appl. No. 15/038,307.

\* cited by examiner

POLYMER ELECTROLYTE FILM

CROSS REFERENCE TO RELATED APPLICATIONS

This application is a National Stage of International Application No. PCT/JP2014/081779 filed Dec. 1, 2014, claiming priority based on Japanese Patent Application No. 2013-248728 filed Nov. 29, 2013, the contents of all of which are incorporated herein by reference in their entirety.

TECHNICAL FIELD

The present invention relates to polymer electrolyte membranes.

BACKGROUND ART

Fuel cells are devices that directly convert the chemical energy of a fuel into electric energy through electrochemical oxidization of the fuel, such as hydrogen or methanol, in the cells and provide the electric energy. Thus, they draw attention as clean electric energy sources. In particular, polymer electrolyte fuel cells work at a lower temperature than other fuel cells, and thus are expected to be used in alternative power sources for automobiles, cogeneration systems for individual family homes, portable generators, and other applications.

Such polymer electrolyte fuel cells are each provided with at least a membrane electrode assembly including gas diffusion electrodes, each of which is composed of a laminate of an electrode catalyst layer and a gas diffusion layer, bonded to both surfaces of an electrolyte membrane. The electrolyte membrane mentioned here is a material having a strong acid group such as a sulfonic acid group or a carboxylic acid group in the polymer chain and having an ability to selectively allow protons to pass therethrough.

Polymer electrolyte membranes are used in fuel cells in environments where the amount of water varies. However, the polymer electrolyte membranes swell with water to show a great dimensional change, and thus they need improvement in durability and reliability. In order to reduce such a dimensional change, various ways of embedding a reinforcing film in the electrolyte are proposed.

For example, Patent Literature 1 discloses a composite membrane for polymer electrolyte fuel cells, comprising: (a) a stretched, expanded polytetrafluoroethylene membrane having a first main surface and a second main surface, having a microstructure of polymer fibrils and having a thickness of 0.06 mil (1.5 μm) to 0.8 mil (20 μm) and an average pore size of 0.05 to 0.4 μm; and (b) an ion exchange material impregnated throughout the microstructure of the membrane, the impregnated, stretched, expanded polytetrafluoroethylene having a Gurley number of greater than 10000 seconds, wherein the ion exchange material substantially impregnates the membrane so as to render the first main surface, the second main surface, and the whole of an interior volume of the membrane substantially uniformly occlusive.

Patent Literature 2 discloses an electrochemical cell membrane comprised of a composite membrane comprised of expanded polytetrafluoroethylene and ion exchange polymer as matrix polymer, the expanded polytetrafluoroethylene being made from polytetrafluoroethylene fine powder having a standard specific gravity (SSG) of no more than about 2.16, a breaking strength of at least about 5.5 lb force (24.5 N), and a stress-relaxation time of at least about 500 sec.

Patent Literature 3 discloses a composite membrane comprising (a) an elongated, expanded polytetrafluoroethylene membrane having an internal microstructure consisting essentially of nodes interconnected by fibrils, the nodes aligned substantially in parallel, being highly elongated and having an aspect ratio of 25:1 or greater; and (b) an ion exchange material impregnated throughout the membrane, the impregnated, elongated, expanded polytetrafluoroethylene membrane having a Gurley number of greater than 10,000 seconds, wherein the ion exchange material substantially impregnates the membrane so as to render an interior volume of the membrane substantially occlusive.

Patent Literature 4 discloses a composite comprising a porous polymeric membrane, wherein the porosity of the membrane is at least partially filled with resin, the resin having a room temperature flexural modulus of greater than about 1 GPa, and wherein the membrane satisfies the following equation: 75 MPa<(longitudinal membrane tensile modulus+transverse membrane tensile modulus)/2. Patent Literature 4 includes no description about polymer electrolyte membranes.

CITATION LIST

Patent Literature

Patent Literature 1: JP 4402625 B
Patent Literature 2: JP 2008-512551 T
Patent Literature 3: JP 2005-520002 T
Patent Literature 4: JP 2006-504848 T

SUMMARY OF INVENTION

Technical Problem

Conventional techniques use a porous film as a reinforcing film. Here, in order to maintain the strength of a porous film, the porous film needs to be dense and have a small pore size. However, such a porous film cannot be filled with a large amount of polymer electrolyte. Thus, the performance of polymer electrolyte membranes needs to be further improved.

In order to maintain the film strength high, the porous film needs to have a large thickness. Thus, it is almost impossible to make polymer electrolyte membranes thin and produce small cells.

An object of the present invention is to provide a polymer electrolyte membrane having excellent strength, a small dimensional change, and a low membrane resistance.

Solution to Problem

The present invention relates to a polymer electrolyte membrane including a porous film having pores; and a polymer electrolyte contained in the pores, the porous film being obtained by copolymerizing tetrafluoroethylene and an ethylenic comonomer to provide polytetrafluoroethylene and then stretching the polytetrafluoroethylene, the porous film having an average pore size of greater than 0.20 μm.

The polymer electrolyte is preferably a fluoropolymer electrolyte.

The fluoropolymer electrolyte is preferably a copolymer comprising a repeating unit derived from a COOZ or SO$_3$Z group-containing monomer represented by the following formula (I):

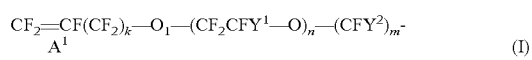

$$CF_2=CF(CF_2)_k-O_1-(CF_2CFY^1-O)_n-(CFY^2)_m-A^1 \quad (I)$$

wherein $Y^1$ is F, Cl, or a perfluoroalkyl group; k is an integer of 0 to 2; l is 0 or 1; n is an integer of 0 to 8, n $Y^1$s may be the same as or different from each other; $Y^2$ is F or Cl; m is an integer of 0 to 12, if m=0, l=0 and n=0, m $Y^2$s may be the same as or different from each other; $A^1$ is COOZ or $SO_3Z$, where Z is an alkali metal, an alkaline earth metal, hydrogen, or $NR^1R^2R^3R^4$, where $R^1$, $R^2$, $R^3$, and $R^4$ are each a C1-C3 alkyl group or hydrogen, and a repeating unit derived from tetrafluoroethylene.

The polytetrafluoroethylene preferably includes 0.011 mol % or more of a polymerized unit derived from the ethylenic comonomer in all the monomer units.

The polytetrafluoroethylene preferably includes 0.025 mol % or more of a polymerized unit derived from the ethylenic comonomer in all the monomer units.

The ethylenic comonomer is preferably perfluoro(methyl vinyl ether).

The porous film preferably has a product of vertical and lateral matrix tensile strengths of $2.20 \times 10^4$ MPa$^2$ or greater.

The porous film preferably has a contact angle with a solution of the polymer electrolyte of smaller than 50 degrees.

The porous film preferably has a film density of 1.4 g/cm$^3$ or lower.

The porous film preferably has a thickness of smaller than 20 μm.

The polytetrafluoroethylene has a standard specific gravity of 2.160 or lower.

The present invention also relates to a membrane electrode assembly comprising the polymer electrolyte membrane.

The present invention also relates to a polymer electrolyte fuel cell comprising the membrane electrode assembly.

Advantageous Effects of Invention

Since the polymer electrolyte membrane of the present invention has the aforementioned configuration, it has excellent strength, a small dimensional change, and a low membrane resistance.

DESCRIPTION OF EMBODIMENTS

Figure 1:
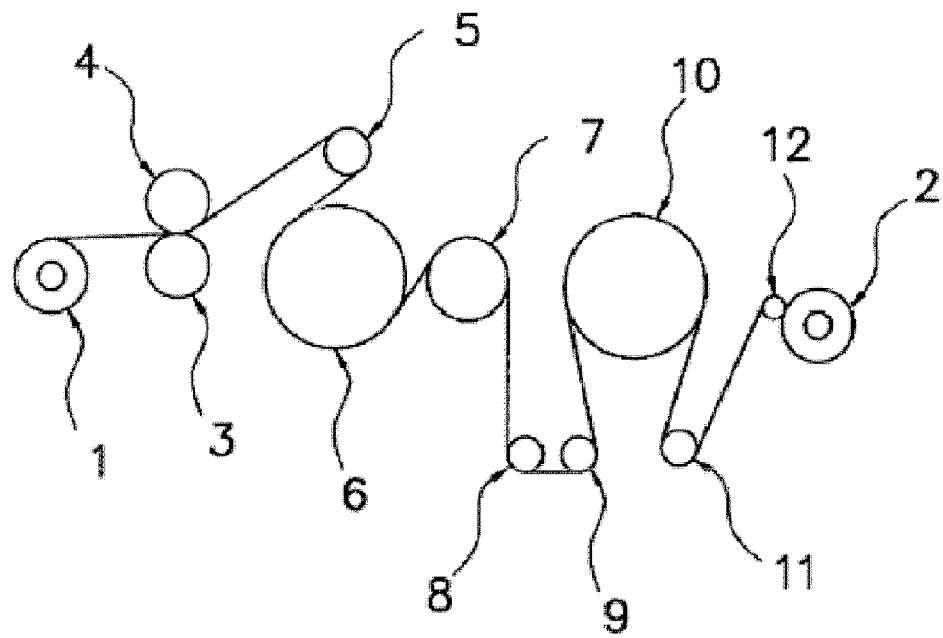
FIG. 1 is a schematic cross-section view of an outline of a roll stretching machine used in the examples.

The present invention will be described in detail below.

The polymer electrolyte membrane of the present invention includes a porous film having pores and a polymer electrolyte contained in the pores.

The porous film is obtained by copolymerizing tetrafluoroethylene and an ethylenic comonomer to provide polytetrafluoroethylene and then stretching the polytetrafluoroethylene.

The porous film is obtained by copolymerizing tetrafluoroethylene (TFE) and an ethylenic comonomer to provide polytetrafluoroethylene (PTFE) and then stretching the PTFE, and the porous film has an average pore size of greater than 0.20 μm.

Since the porous film of the polymer electrolyte membrane of the present invention is obtained by copolymerizing TFE and an ethylenic comonomer to provide PTFE and then stretching the PTFE and has a pore size of greater than 0.20 μm, the polymer electrolyte membrane has excellent strength, a small dimensional change, and a low membrane resistance.

Even though the porous film has a large pore size, the porous film can maintain high strength and a large amount of the polymer electrolyte can be impregnated into the porous film. Thus, the polymer electrolyte membrane of the present invention has excellent strength, a small dimensional change, and a low membrane resistance, so that the electrolyte membrane shows improved performance.

Even a thin film can achieve a high strength, and thus the polymer electrolyte membrane can be made thin and a small cell can be produced.

The ethylenic comonomer may be any comonomer copolymerizable with TFE. Examples thereof include perfluoroolefins such as hexafluoropropylene (HFP); chlorotrifluoroolefins such as chlorotrifluoroethylene (CTFE); hydrogen-containing fluoroolefins such as trifluoroethylene and vinylidene fluoride (VDF); perfluorovinyl ether; (perfluoroalkyl)ethylenes, and ethylene. One ethylenic comonomer may be used alone, or multiple ethylenic comonomers may be used in combination.

The perfluorovinyl ether may be any ether, and examples thereof include unsaturated perfluoro compounds represented by the following formula (A):

$$CF_2 = CF - ORf \quad (A)$$

wherein Rf is a perfluoroorganic group. The term "perfluoroorganic group" herein means an organic group in which all the hydrogen atoms bonded to the carbon atoms are replaced by fluorine atoms. The perfluoroorganic group may have ether oxygen.

Examples of the perfluorovinyl ether include perfluoro(alkyl vinyl ethers) (PAVE) represented by the formula (A) wherein Rf is a C1-C10 perfluoroalkyl group. The carbon number of the perfluoroalkyl group is preferably 1 to 5.

Examples of the perfluoroalkyl group in the PAVE include a perfluoromethyl group, a perfluoroethyl group, a perfluoropropyl group, a perfluorobutyl group, a perfluoropentyl group, and a perfluorohexyl group.

Examples of the perfluorovinyl ether further include those represented by the formula (A) (wherein Rf is a C4-C9 perfluoro(alkoxyalkyl) group); those represented by the formula (A) (wherein Rf is a group represented by the following formula:

$$\text{(structure with } CF_3, F, O \text{ ring and } -O-CF(CF_3)-CF_2-)_m$$

(wherein m is 0 or an integer of 1 to 4)); and those represented by the formula (A) (wherein Rf is a group represented by the following formula:

$$CF_3CF_2CF_2-(O-CF(CF_3)-CF_2)_n-$$

(wherein n is an integer of 1 to 4)).

The (perfluoroalkyl)ethylenes (PFAE) may be any one, and examples thereof include (perfluorobutyl)ethylene (PFBE) and (perfluorohexyl)ethylene.

In order to provide a porous film having excellent strength even if the pore size is large, the ethylenic comonomer is preferably at least one selected from the group consisting of hexafluoropropylene, chlorotrifluoroethylene, vinylidene fluoride, fluoro(alkyl vinyl ethers), (perfluoroalkyl)ethylenes, and ethylene, more preferably at least one selected from the group consisting of perfluoro(methyl vinyl ether), perfluoro(propyl vinyl ether), (perfluorobutyl)ethylene, (perfluorohexyl)ethylene, and (perfluorooctyl)ethylene, still more preferably perfluoro(methyl vinyl ether).

The ethylenic comonomer particularly preferably consists only of perfluoro(methyl vinyl ether).

In order to provide a porous film having excellent strength and to provide a polymer electrolyte membrane having excellent strength, a small dimensional change, and a low membrane resistance even if the pore size is large, the PTFE preferably includes 0.011 mol % or more of a polymer unit derived from the ethylenic comonomer in all the monomer units. The amount of the polymer unit derived from the ethylenic comonomer is more preferably 0.015 mol % or more, still more preferably 0.020 mol % or more, particularly preferably 0.025 mol % or more.

For good homogeneity of the porous film, the amount of the polymer unit derived from the ethylenic comonomer is preferably 0.250 mol % or less, more preferably 0.150 mol % or less, still more preferably 0.100 mol % or less, most preferably 0.050 mol % or less.

The PTFE is preferably PTFE without a history of being heated at a temperature not lower than the primary melting point.

The PTFE may be non-sintered PTFE or may be semi-sintered PTFE. For simple processing or easy control of the thickness and the pore size, non-sintered PTFE is preferred. For high strength or a small pore size distribution of a porous film, especially a biaxially stretched porous film, semi-sintered PTFE is preferred.

The non-sintered PTFE may be untreated PTFE after being polymerized, for example.

The non-sintered PTFE is PTFE that has never been heated up to a temperature not lower than the secondary melting point. The semi-sintered PTFE is PTFE without a history of being heated at a temperature not lower than the primary melting point but with a history of being heated at a temperature not higher than the primary melting point but not lower than the secondary melting point.

The primary melting point means a maximum peak temperature of an endothermic curve on the crystal melting curve obtained by differential scanning calorimetry on non-sintered PTFE.

The secondary melting point means a maximum peak temperature of an endothermic curve on the crystal melting curve obtained by differential scanning calorimetry on PTFE heated up to a temperature (e.g., 360° C.) not lower than the primary melting point.

The endothermic curve herein is obtained by increasing the temperature at a temperature-increasing rate of 10° C./min using a differential scanning calorimeter.

In order to provide a porous film having higher strength and excellent homogeneity and to provide a polymer electrolyte membrane having excellent strength, a small dimensional change, and a low membrane resistance, the PTFE preferably has an average primary particle size of 150 nm or greater. The average primary particle size is more preferably 180 nm or greater, still more preferably 210 nm or greater, particularly preferably 220 nm or greater.

The greater the average primary particle size of the PTFE is, the more an increase in the paste extrusion pressure is suppressed and the better the moldability is during paste extrusion molding of the PTFE powder. The upper limit may be any value, and may be 500 nm. For good productivity in the polymerization step, the upper limit is preferably 350 nm.

The average primary particle size can be determined as follows. Using a PTFE aqueous dispersion obtained by polymerization, a calibration curve is drawn between the transmittance of 550 nm incident light to the unit length of the aqueous dispersion with a polymer concentration of 0.22 mass % and the average primary particle size determined by measuring the Feret diameters in a transmission electron micrograph; the transmittance of the target aqueous dispersion is measured; and then the average particle size is determined on the basis of the calibration curve.

The polytetrafluoroethylene may have a core-shell structure. The core-shell structured polytetrafluoroethylene may be, for example, a modified polytetrafluoroethylene whose particles each include a core of a high molecular weight polytetrafluoroethylene and a shell of a lower molecular weight polytetrafluoroethylene or modified polytetrafluoroethylene. Such a modified polytetrafluoroethylene may be polytetrafluoroethylene described in JP 2005-527652 T, for example.

In order to provide a porous film having excellent strength and to provide a polymer electrolyte membrane having excellent strength, a small dimensional change, and a low membrane resistance even if the pore size is large, the PTFE preferably has a standard specific gravity (SSG) of 2.160 or lower. Polytetrafluoroethylene having a SSG of 2.160 or lower is suitable for stretch molding because an extrudate thereof shows a stretching magnification of three times or more. For better stretchability, the SSG is more preferably 2.155 or lower, still more preferably 2.150 or lower, particularly preferably 2.145 or lower.

For suppression of an increase in the paste extrusion pressure and excellent moldability during paste extrusion molding, the standard specific gravity is preferably 2.130 or higher.

The SSG is a SSG defined in ASTM D4895-89 as a standard for the molecular weight of polytetrafluoroethylene without melt-molding fabricability.

In order to provide a porous film having excellent strength and to provide a polymer electrolyte membrane having excellent strength, a small dimensional change, and a low membrane resistance even if the pore size is large, the PTFE preferably shows an extrusion pressure of 22.0 MPa or lower, more preferably 20.0 MPa or lower, still more preferably 19.0 MPa or lower, particularly preferably 18.0 MPa or lower.

If the extrusion pressure is too high, the resulting extrudate tends to be hard and less likely to be compressed during a rolling step to be mentioned later, so that the homogeneity of the porous film tends to be poor. PTFE having a low extrusion pressure tends to cause a porous film to have low strength. Still, even with an extrusion pressure within the above range, the porous film can surprisingly have excellent strength.

The lower limit of the extrusion pressure may be any value, and may be 12.0 MPa, for example.

The extrusion pressure is a value determined by the following method.

First, 100 g of PTFE fine powder is left to stand at room temperature for two hours or longer. The powder is blended with 21.7 g of a lubricant (trade name: Isopar H (registered tradename), product of Exxon Mobil Corp.) for three minutes. Thereby, a PTFE fine powder mixture is obtained.

The resulting PTFE fine powder mixture is left to stand for two hours in a 25° C. temperature-constant chamber, and then paste-extruded through an orifice (diameter: 2.5 mm, land length: 1.1 cmm, introduction angle: 30°) at a reduction ratio (ratio between the cross-section area of the inlet of the die and the cross-section area of the outlet thereof) of 100 and an extrusion rate of 51 cm/min at 25° C. Thereby, beading is obtained.

The extrusion pressure is a value determined by measuring a load when the extrusion load reaches equilibrium during the paste extrusion, and then dividing the measured load by the cross-section area of a cylinder used in the paste extrusion.

The porous film can be produced from PTFE fine powder comprising the aforementioned PTFE.

The PTFE fine powder usually has an average particle size of 100 to 1000 μm. In order to provide a porous film having better homogeneity, the average particle size is preferably 300 to 800 μm, more preferably 400 to 700 μm.

The average particle size of the PTFE fine powder is a value determined in conformity with JIS K6891.

The PTFE fine powder usually has an apparent density of 0.35 to 0.60 g/ml. In order to provide a biaxially stretched porous film having better homogeneity, the apparent density is preferably 0.40 to 0.55 g/ml.

The apparent density is a value determined in conformity with JIS K6892.

The PTFE fine powder usually has stretchability, fibrillatability, and non-melt-fabricability.

The PTFE can be produced by a production method including a step of adding a surfactant, an aqueous medium, tetrafluoroethylene, and an ethylenic comonomer to a polymerization vessel, and a step of adding a polymerization initiator to the polymerization vessel and then starting emulsion copolymerization of the TFE and the ethylenic comonomer.

TFE and the ethylenic comonomer may be added at once before the start of the polymerization, or may be added continually or intermittently. In order to stretch a film at a high ratio easily, the monomers are preferably added at once before the start of the polymerization.

The method for producing the PTFE may include a step of coagulating the PTFE in a PTFE aqueous dispersion obtained by the emulsion copolymerization. Coagulation of the PTFE provides PTFE fine powder.

The method for producing the PTFE usually includes a step of collecting the coagulated PTFE and a step of drying the collected PTFE.

The emulsion copolymerization is described below with reference to a more specific example. For example, an aqueous medium and a surfactant are charged to a pressure-resistant reaction container equipped with a stirrer and the oxygen in the reactor is removed. Then, TFE and an ethylenic comonomer are charged to the reactor and the system is set to a predetermined temperature. Next, a polymerization initiator is added so as to start the emulsion polymerization. The pressure decreases as the reaction proceeds. In order to maintain the initial pressure, the TFE and, if necessary, the ethylenic comonomer are additionally added in a continual or intermittent manner. Addition of the TFE and the ethylenic comonomer is stopped when the amounts thereof reach predetermined amounts. Then, the TFE inside the reactor is purged and the temperature is cooled to room temperature. Thereby, the reaction was completed.

Examples of the surfactant include anionic surfactants, nonionic surfactants, anionic fluorosurfactants, and nonionic fluorosurfactants.

Preferred among the above surfactants are fluorosurfactants such as anionic fluorosurfactants and nonionic fluorosurfactants. Examples of the fluorosurfactants include carboxylic surfactants and sulfonic surfactants.

In order to provide a porous film having higher strength and excellent homogeneity and to provide a polymer electrolyte membrane having excellent strength, a small dimensional change, and a low membrane resistance, the surfactant is more preferably a fluorosurfactant with a Log POW value of 3.4 or lower.

It is feared that compounds with a high Log POW value cause environmental loads. In consideration of this fear, a compound with a Log POW value of 3.4 or smaller is preferred. In conventional production of a fluoropolymer by emulsion polymerization, ammonium perfluorooctanoate (PFOA) is mainly used as a surfactant. However, PFOA has a Log POW value of 3.5, and thus it is preferably replaced by a fluorosurfactant having a Log POW value of 3.4 or lower.

In contrast, fluorosurfactants with a Log POW value of 3.4 or lower disadvantageously have a poor emulsifying ability. In order to provide polytetrafluoroethylene having high breaking strength, the stability of the aqueous dispersion during the polymerization is believed to be important. Actually, use of a fluorosurfactant having a poor emulsifying ability results in insufficient breaking strength.

Thus, WO 2009/001894 A1 discloses a method in which a large amount of a fluorosurfactant with a low Log POW value is used so as to improve the stability of an aqueous dispersion. However, even polytetrafluoroethylene obtained by this method has insufficient breaking strength.

Use of PTFE obtained by emulsion copolymerizing tetrafluoroethylene and an ethylenic comonomer, especially preferably at least perfluoro(methyl vinyl ether) (PMVE), in the presence of a fluorosurfactant with a Log POW value of 3.4 or lower enables production of a porous film having high strength and excellent homogeneity and production of a polymer electrolyte membrane having excellent strength, a small dimensional change, and a low membrane resistance.

In other words, the PTFE is preferably one obtained by emulsion copolymerizing tetrafluoroethylene and an ethylenic comonomer, especially preferably at least perfluoro (methyl vinyl ether), in the presence of a fluorosurfactant with a Log POW value of 3.4 or lower.

The surfactant may be a fluorosurfactant with a Log POW value of 2.5 or higher, or may be a fluorosurfactant with a Log POW value of 3.0 or higher.

The Log POW value is a partition coefficient between 1-octanol and water, and is represented by Log P, wherein P represents the ratio of (fluorosurfactant concentration in octanol)/(fluorosurfactant concentration in water) when an octanol/water (1:1) liquid mixture containing a fluorosurfactant is phase-separated.

The octanol-water partition coefficient represented by Log POW is calculated as follows. HPLC is performed on standard substances (heptanoic acid, octanoic acid, nonanoic acid, and decanoic acid) each having a known octanol-water partition coefficient using TOSOH ODS-120T column (Φ4.6 mm×250 mm) as a column and acetonitrile/0.6 mass % $HClO_4$ aqueous solution=1/1 (vol/vol %) as an eluent at a flow rate of 1.0 ml/min, a sample amount of 300 μL, and a column temperature of 40° C., with detection light of UV 210 nm. A calibration curve between the respective elution times and the known octanol-water partition coefficients is drawn, and the Log POW value is calculated from the elution time of the sample liquid in HPLC based on the calibration curve.

The fluorosurfactant with a Log POW value of 3.4 or lower is preferably an anionic fluorosurfactant. Examples thereof include those disclosed in US 2007/0015864 A, US 2007/0015865 A, US 2007/0015866 A, US 2007/0276103 A, US 2007/0117914 A, US 2007/142541 A, US 2008/0015319 A, U.S. Pat. No. 3,250,808 B, U.S. Pat. No. 3,271,341 B, JP 2003-119204 A, WO 2005/042593 A1, WO 2008/060461 A1, WO 2007/046377 A1, WO 2007/119526 A1, WO 2007/046482 A1, and WO 2007/046345 A1.

The fluorosurfactant with a Log POW value of 3.4 or lower is preferably at least one fluorosurfactant selected from the group consisting of:

those represented by the following formula:

$$CF_3-(CF_2)_4-COOX$$

(wherein X represents a hydrogen atom, $NH_4$, or an alkali metal atom);

those represented by the following formula:

$$CF_3CF_2CF_2OCF(CF_3)COOX$$

(wherein X represents a hydrogen atom, $NH_4$, or an alkali metal atom);

those represented by the following formula:

$$CF_3OCF(CF_3)CF_2OCF(CF_3)COOX$$

(wherein X represents a hydrogen atom, $NH_4$, or an alkali metal atom); and those represented by the following formula:

$$CF_3CF_2OCF_2CF_2OCF_2COOX$$

(wherein X represents a hydrogen atom, $NH_4$, or an alkali metal atom).

The fluorosurfactant with a Log POW value of 3.4 or lower may also be any of those represented by the following formula:

$$CF_3OCF_2CF_2OCF_2CF_2COOX$$

(wherein X represents a hydrogen atom, $NH_4$, or an alkali metal atom) and those represented by the following formula:

$$CF_3OCF_2CF_2CF_2OCHFCF_2COOX$$

(wherein X represents a hydrogen atom, $NH_4$, or an alkali metal atom).

If the fluorosurfactant is a salt, a counter ion constituting the salt may be an alkali metal ion or $NH_4^+$, for example, and examples of the alkali metal ion include $Na^+$ and $K^+$.

Examples of the fluorosurfactant with a Log POW value of 3.4 or lower include $CF_3OCF(CF_3)CF_2OCF(CF_3)COOH$, $CF_3OCF(CF_3)$ $CF_2OCF(CF_3)COONH_4$, $CF_3CF_2OCF_2$ $CF_2OCF_2COOH$, $CF_3CF_2OCF_2CF_2OCF_2COONH_4$, $CF_3$ $OCF_2CF_2CF_2OCHFCF_2COOH$, $CF_3OCF_2CF_2CF_2$ $OCHFCF_2COONH_4$, $CF_3-(CF_2)_4-COOH$, $CF_3-(CF_2)_4-COONH_4$, $CF_3CF_2CF_2OCF(CF_3)COONH_4$, and $CF_3CF_2CF_2OCF(CF_3)COOH$.

The total amount of the surfactant added is preferably 0.0001 to 10 mass % based on the amount of the aqueous medium. The lower limit thereof is more preferably 0.1 mass %, whereas the upper limit thereof is more preferably 2 mass %, still more preferably 1 mass %.

If the total amount of the surfactant is too small, the emulsified particles may have poor stability and the yield may be insufficient, so that the system may be unstable; for example, a large amount of coagulated matter is generated or a large amount of matter is attached to the reactor during and after the reaction. If the total amount of the surfactant is too large, the effect of improving the stability does not compensate for the amount. On the contrary, the system may be unstable; for example, the polymerization rate may decrease or the reaction may stop.

The surfactant may be added to the reactor at once before the start of the polymerization reaction, or may be continually or intermittently added thereto after the start of the polymerization reaction.

The amount of the surfactant is appropriately determined in accordance with, for example, the stability of the emulsified particles and the primary particle size of the target PTFE.

The polymerization initiator used in the emulsion copolymerization can be any of those conventionally used in polymerization of TFE.

The polymerization initiator in the emulsion copolymerization may be a radical polymerization initiator or a redox polymerization initiator, for example.

In order to provide a low SSG PTFE, the amount of the polymerization initiator is preferably as small as possible. Still, too small an amount of the polymerization initiator tends to cause too low a polymerization rate, whereas too large an amount thereof tends to cause generation of a high SSG PTFE.

Examples of the radical polymerization initiator include water-soluble peroxides. The radical polymerization initiator is preferably any of persulfates, such as ammonium persulfate and potassium persulfate, and water-soluble organic peroxides, such as disuccinic acid peroxide, more preferably ammonium persulfate or disuccinic acid peroxide. One of these initiators may be used, or two or more of these may be used in combination.

The amount of the radical polymerization initiator can be appropriately selected in accordance with the polymerization temperature and the target SSG. It is preferably an amount corresponding to 1 to 100 ppm, more preferably an amount corresponding to 1 to 20 ppm, still more preferably an amount corresponding to 1 to 6 ppm, of the mass of an aqueous medium usually used.

If the polymerization initiator is a radical polymerization initiator, a low SSG PTFE can be easily obtained by adding a radical scavenger during the polymerization.

Examples of the radical scavenger include unsubstituted phenols, polyphenols, aromatic hydroxy compounds, aromatic amines, and quinone compounds. Hydroquinone is particularly preferred.

In order to provide a low SSG PTFE, the radical scavenger is preferably added before 50 mass % of the whole TFE to be consumed in the polymerization reaction is polymerized. The radical scavenger is more preferably added before 40 mass %, still more preferably 30 mass %, of the whole TFE is polymerized.

The amount of the radical scavenger is preferably an amount corresponding to 0.1 to 20 ppm, more preferably an amount corresponding to 3 to 10 ppm, of the mass of an aqueous medium used.

If the polymerization initiator is a radical polymerization initiator, the radical concentration in the system may be adjusted by adding a decomposer for peroxides such as ammonium sulfite during the polymerization.

Examples of the redox polymerization initiator include combination of any oxidizing agent, such as permanganates (e.g., potassium permanganate), persulfates, bromates, chlorates, and hydrogen peroxide, and any reducing agent, such as sulfites, bisulfites, organic acids (e.g., oxalic acid or succinic acid), thiosulfates, ferrous chloride, and diimines. Each of the oxidizing agents and each of the reducing agents may be used alone or in combination of two or more.

Particularly preferred is a combination of potassium permanganate and oxalic acid.

The amount of the redox polymerization initiator can be appropriately selected in accordance with the type of a redox polymerization initiator used, the polymerization temperature, and the target SSG. The amount thereof is preferably an amount corresponding to 1 to 100 ppm of the mass of an aqueous medium used.

In order to initiate the polymerization reaction by the redox polymerization initiator, the oxidizing agent and the reducing agent may be simultaneously added, or either of the oxidizing agent or the reducing agent may be added to the reactor in advance, and then the remaining agent is added thereto.

In the case of initiating the polymerization with the redox polymerization initiator by adding either of the oxidizing agent or the reducing agent to the reactor in advance, and then adding the remaining agent, the remaining agent is preferably added continually or intermittently.

If the remaining agent of the redox polymerization initiator is added continually or intermittently in order to obtain a low SSG PTFE, the adding rate is preferably gradually reduced, more preferably the addition is stopped during the polymerization. The timing of stopping the addition is preferably before 80 mass % of the whole TFE to be consumed in the polymerization reaction is polymerized. The timing is more preferably before 65 mass % of the whole TFE is polymerized, still more preferably before 50 mass % of the whole TFE is polymerized, particularly preferably before 30 mass % of the whole TFE is polymerized.

In order to adjust the pH in the aqueous medium within a range that does not deteriorate the redox reactivity in the case of using a redox polymerization initiator, a pH buffer is preferably used. Examples of the pH buffer include inorganic salts such as disodium hydrogen phosphate, sodium dihydrogen phosphate, and sodium carbonate, and disodium hydrogen phosphate dihydrate and disodium hydrogen phosphate dodecahydrate are preferred.

In the case of using a redox polymerization initiator, the redox-reactive metal ion can be a metal having multiple ionic valences. Specific examples thereof include, preferably, transition metals such as iron, copper, manganese, and chromium, and iron is particularly preferred.

The aqueous medium means a medium which gives a place of the polymerization and is a liquid that contains water. The aqueous medium may be water alone or any of those containing water. It may be a medium containing water and one or both of any fluorine-free organic solvent, such as alcohols, ethers, and ketones, and any fluorine-containing organic solvent having a boiling point of 40° C. or lower.

The polymerization can be performed under a pressure of 0.05 to 5.0 MPa. The pressure is preferably within the range of 0.5 to 3.0 MPa.

The polymerization can be performed at a temperature of 10° C. to 100° C. The temperature is preferably within the range of 50° C. to 90° C.

In the polymerization, any known additive such as stabilizers and chain-transfer agents may be added in accordance with the purposes.

Examples of the stabilizers include saturated hydrocarbons that are substantially inactive to the reaction, are in the form of liquid under the aforementioned reaction conditions, and have 12 or more carbon atoms. In particular, paraffin wax is preferred. The paraffin wax may be in any form, i.e., liquid, semisolid, or solid, at room temperature. It is preferably a saturated hydrocarbon having 12 or more carbon atoms. In general, the paraffin wax preferably has a melting point of 40° C. to 65° C., more preferably 50° C. to 65° C.

Examples of the dispersion stabilizer other than the saturated hydrocarbons include fluorine-type oils, fluorine-type solvents, and silicone oils. Each of these may be used alone or two or more of these may be used in combination. The stabilizer can be used in an amount of 1 to 10 parts by mass based on 100 parts by mass of the aqueous medium.

The chain-transfer agents may be any of known agents, and examples thereof include saturated hydrocarbons such as methane, ethane, propane, and butane, halogenated hydrocarbons such as chloromethane, dichloromethane, and difluoroethane, alcohols such as methanol and ethanol, and hydrogen. The amount of the chain-transfer agent is usually 1 to 1000 ppm, preferably 1 to 500 ppm, based on the whole amount of the TFE supplied.

In order to adjust the pH in the aqueous medium within a range that does not deteriorate the redox reactivity, a pH buffer is preferably used. Examples of the pH buffer include inorganic salts such as disodium hydrogen phosphate, sodium dihydrogen phosphate, and sodium carbonate, and disodium hydrogen phosphate dihydrate and disodium hydrogen phosphate dodecahydrate are preferred.

In the case of using a redox polymerization initiator, the redox-reactive metal ion can be a metal having multiple ionic valences. Specific examples thereof include, preferably, transition metals such as iron, copper, manganese, and chromium, and iron is particularly preferred.

In order to reduce the amount of coagulum generated during the polymerization, the polymerization may be performed in the presence of 5 to 500 ppm of a dicarboxylic acid based on the amount of the aqueous medium. In such a case, the polymerization is preferably performed in the presence of 10 to 200 ppm of the dicarboxylic acid. If the amount of the dicarboxylic acid is too small relative to the aqueous medium, insufficient effects may be achieved. If the amount thereof is too large, a chain transfer reaction may occur so that the resulting polymer may have a low molecular weight. The amount of the dicarboxylic acid is more preferably 150 ppm or less. The dicarboxylic acid may be added before the start of the polymerization reaction, or may be added during the polymerization.

The dicarboxylic acid is preferably any of those represented by the formula: HOOCRCOOH (wherein R represents a C1-C5 alkylene group), more preferably succinic acid, malonic acid, glutaric acid, adipic acid, or pimelic acid, still more preferably succinic acid.

When the polymerization of PTFE is completed, an aqueous dispersion having a solid concentration of 10 to 50 mass % can be obtained. The aqueous dispersion contains the fluorosurfactant and polytetrafluoroethylene. The polytetrafluoroethylene has an average primary particle size of 150 to 500 nm.

The production method preferably includes a step of coagulating the PTFE in the resulting PTFE aqueous dispersion, a step of collecting the coagulated PTFE, and a step of drying the collected PTFE. Coagulation of the polytetrafluoroethylene contained in the aqueous dispersion leads to production of PTFE fine powder.

Coagulation of the polytetrafluoroethylene contained in the aqueous dispersion leads to production of fine powder. The polytetrafluoroethylene aqueous dispersion can be produced into and collected as fine powder after coagulation, washing, and drying, and then the fine powder can be used in production of porous films. In the case of coagulating the polytetrafluoroethylene in the aqueous dispersion, the aqueous dispersion obtained by polymerization of polymer latex, for example, is usually diluted with water to a polymer concentration of 10 to 20 mass %. The temperature of the diluted product is adjusted to 5° C. to 50° C., and the pH thereof may be adjusted to neutral or alkali, if necessary, and then the product is stirred in a reactor equipped with a stirrer more vigorously than during the reaction. The coagulating temperature can be appropriately selected in accordance with the shape and size of a stirrer used, the polymer concentration, and the target average particle size of fine powder. The coagulation may be performed under stirring while adding any of water-soluble organic compounds such as methanol and acetone, inorganic salts such as potassium nitrate and ammonium carbonate, and inorganic acids such as hydrochloric acid, sulfuric acid, and nitric acid as a coagulating agent. The coagulation may be continually performed using, for example, an inline mixer.

The drying of wet powder obtained by coagulating the PTFE is usually performed with the wet powder being maintained in a state of not so much flowing, preferably in a state of being left to stand, by means of vacuum, high frequency, hot air, or the like. In general, friction between particles, especially at high temperature, adversely affects the polytetrafluoroethylene fine powder. This is because the particles of such polytetrafluoroethylene are characteristically easily fibrillated even by a low shearing force, losing the originally stable particle structure. The drying can be performed at a drying temperature of 10° C. to 250° C., preferably 120° C. to 230° C.

Since the porous film includes the above specific PTFE, it has high strength even if the pore size is large. In other words, since the porous film having a low film density while maintaining high strength can be obtained, a polymer electrolyte membrane having excellent strength, a small dimensional change, and a low membrane resistance can be obtained.

The porous film is preferably a biaxially stretched porous film. The biaxially stretched porous film preferably has a product of vertical and lateral matrix tensile strengths of $2.20 \times 10^4$ MPa$^2$ or higher, more preferably $3.00 \times 10^4$ MPa$^2$ or higher, still more preferably $4.50 \times 10^4$ MPa$^2$ or higher.

The vertical and lateral matrix tensile strengths are values determined by the following methods.
(Vertical Matrix Tensile Strength)

Five samples were cut out of the biaxially stretched porous film. Each sample has a dimension of 15.0 cm in the machine direction (longitudinal direction, i.e., paste extruding direction) and 2.0 cm in the transverse direction (width direction, i.e., direction perpendicular to the paste extruding direction). For the five samples, the tensile strength in the machine direction was measured and the maximum loads of the respective five samples were determined.

Then, the largest one and the smallest one of the maximum loads of the five samples were excluded and an average value of the remaining three values was calculated. This average value was defined as the vertical average maximum load.

The vertical matrix tensile strength is determined by the following formula using the vertical average maximum load, the sample width (2.0 cm), the thickness (unit: cm), and the porosity.
(Lateral Matrix Tensile Strength)

Five samples were cut out of the biaxially stretched porous film. Each sample has a dimension of 2.0 cm in the machine direction (longitudinal direction, i.e., paste extruding direction) and 15.0 cm in the transverse direction (width direction, i.e., direction perpendicular to the paste extruding direction). For the five samples, the tensile strength in the transverse direction was measured and the maximum loads of the respective five samples were determined.

Then, an average value was calculated in the same manner as in the vertical direction, and the lateral matrix tensile strength is determined by the following formula.

Lateral matrix tensile strength={(lateral average maximum load)/(2.0×thickness)}/(1−porosity).

The tensile strength measurements are performed using a tensile tester equipped with a 50 N load cell at a chuck length of 5.0 cm and a cross-head speed of 300 ram/min.

The porosity is a value determined by the following formula:

Porosity=1−(film density/PTFE true density).

The PTFE true density is 2.2 g/cm$^3$.

The thickness and the film density are determined by the methods to be mentioned later.

In order to achieve good impregnation of the electrolyte polymer, the porous film preferably has a film density of 1.4 g/cm$^3$ or lower. The film density is more preferably 1.00 g/cm$^3$ or lower, still more preferably 0.80 g/cm$^3$ or lower.

The film density is a value determined by the following method.

A rectangular sample with a size of 4.0 cm×12.0 cm is cut out of the porous film, and the mass of the sample is measured using a precision scale, and the film density of the sample is calculated by the following formula based on the measured mass and the thickness.

$$\rho = M/(4.0 \times 12.0 \times t)$$

wherein
 $\rho$=film density (g/cm$^3$)
 M=mass (g)
 t=thickness (cm).

The measurement and the calculation are performed at three points, and the average value thereof is defined as the film density.

The porous film has an average pore size of greater than 0.20 μm. With an average pore size within the above range, a larger amount of the polymer electrolyte can be impregnated into the porous film and the performance of the electrolyte membrane can be improved. The average pore size is more preferably greater than 0.40 μm, still more preferably greater than 0.50 μm.

The average pore size is also preferably 2.00 μm or smaller, more preferably 1.00 μm or smaller, still more preferably 0.80 μm or smaller.

The average pore size was a mean flow pore size (MFP) measured in conformity with ASTM F316-86.

For good durability, the thickness of the porous film is preferably smaller than 20 μm, more preferably 15 μm or smaller, still more preferably 10 μm or smaller, particularly preferably 5.0 μm or smaller.

The thickness of the porous film is preferably 1.0 μm or greater, more preferably 1.5 μm or greater.

The thickness is determined as follows: five porous films are stacked and the total thickness is measured using a thickness meter, and the measured value is divided by 5. The quotient is defined as the thickness of one film.

In order to impregnate a larger amount of the polymer electrolyte into the porous film for the purpose of improving the performance of the electrolyte membrane, the porous film preferably has a contact angle with a solution of the polymer electrolyte of smaller than 50 degrees. The contact angle is more preferably 40 degrees or smaller, still more preferably 30 degrees or smaller.

The polymer electrolyte solution in the contact angle measurement consists of 10 wt % of a perfluorocarbon sulfonic acid resin having an equivalent weight (EW) of 700, 45 wt % of deionized water, and 45 wt % of 1-propanol.

The contact angle value used was a contact angle measured using a static contact angle meter FM40 Easy Drop (product of KRUSS GmbH) 60 seconds after dropping 5.0 µL of the test solution onto the porous film.

The porous film can be produced by, for example, a production method including: a paste extrusion step of paste extruding PTFE fine powder comprising the PTFE to provide a paste extrudate; a rolling step of rolling the paste extrudate to provide non-sintered PTFE; a drying step of drying the non-sintered PTFE to remove an extrusion aid; optionally a step of semi-sintering the dried non-sintered PTFE to provide semi-sintered PTFE; a uniaxial stretching step of stretching the resulting dried non-sintered PTFE or semi-sintered PTFE in the machine direction (MD) to provide a uniaxially stretched article; and a biaxial stretching step of stretching the resulting uniaxially stretched article in the transverse direction (TD).

The above method easily fibrillates polytetrafluoroethylene, and thereby enables production of a biaxially stretched porous film including nodes and fibrils.

The machine direction (MD) is the same direction as the paste extruding direction in the paste extrusion step. The transverse direction (TD) is a direction perpendicular to the machine direction.

In general, a uniaxially stretched article may be first obtained by stretching in the machine direction after the rolling step (if semi-sintering is performed, the step of providing a semi-sintered article), and then a biaxially stretched article may be obtained by stretching in the transverse direction. Alternatively, a uniaxially stretched article may be first obtained by stretching in the transverse direction after the rolling step (if semi-sintering is performed, the step of providing a semi-sintered article), and then a biaxially stretched article may be obtained by stretching in the machine direction.

Production of the porous film requires no special equipment design, and can be achieved by very usual molding and stretching equipment.

The production method preferably includes, before the paste extrusion step, a step of adding a liquid lubricant such as solvent naphtha or white oil to the PTFE fine powder and mixing the components to provide PTFE fine powder mixed with the liquid lubricant.

The amount of the liquid lubricant is preferably 17 to 34 parts by mass based on 100 parts by mass of the PTFE fine powder, although it is in accordance with, for example, the paste extrusion conditions to be mentioned later.

The paste extrusion step is preferably such that a rod-like or sheet-like paste extrudate is obtained using an extruder equipped with a die having a specific diameter or a die capable of providing a sheet-like extrudate.

In the paste extrusion step, the extrusion pressure can be appropriately set in accordance with the extruder used and the extrusion rate, for example.

In order to provide a porous film having high strength and excellent homogeneity, the extrusion temperature in the paste extrusion step is preferably 5° C. to 100° C. The extrusion temperature is more preferably 30° C. to 80° C.

The rolling temperature in the rolling step is preferably 5° C. to 100° C., more preferably 30° C. to 80° C.

The drying step may be performed at room temperature or under heating. If a liquid lubricant is used as mentioned above, the drying can remove the liquid lubricant. The drying temperature is preferably 70° C. to 280° C., more preferably 100° C. to 250° C., although it is in accordance with, for example, the type of the liquid lubricant.

The rolling can be performed using a mill roll or a belt press, for example.

The production method may include a step of semi-sintering the non-sintered PTFE to provide a semi-sintered PTFE, if necessary.

The semi-sintering is a step of heating the PTFE at a temperature of not lower than the secondary melting point but not higher than the primary melting point.

The primary melting point means a maximum peak temperature of an endothermic curve on the crystal melting curve obtained by differential scanning calorimetry on non-sintered PTFE.

The secondary melting point means a maximum peak temperature of an endothermic curve on the crystal melting curve obtained by differential scanning calorimetry on PTFE heated up to a temperature (e.g., 360° C.) not lower than the primary melting point.

The endothermic curve herein is obtained by increasing the temperature at a temperature-increasing rate of 10° C./min using a differential scanning calorimeter.

In order to provide a porous film having higher strength and to provide a polymer electrolyte membrane having excellent strength, a small dimensional change, and a low membrane resistance even if the pore size is large, the stretch ratio in the uniaxial stretching step is preferably 2 to 50 times, more preferably 5 to 30 times.

In order to provide a porous film having higher strength and to provide a polymer electrolyte membrane having excellent strength, a small dimensional change, and a low membrane resistance even if the pore size is large, the stretching temperature in the uniaxial stretching step is preferably room temperature to a temperature of lower than the primary melting point, more preferably 200° C. to 330° C., still more preferably 250° C. to 300° C.

In order to provide a porous film having high strength and excellent homogeneity and to provide a polymer electrolyte membrane having excellent strength, a small dimensional change, and a low membrane resistance, the stretching rate in the uniaxial stretching step is preferably 5 to 2000%/sec, more preferably 7 to 1000%/sec, still more preferably 10 to 700%/sec.

The uniaxial stretching may be performed by any method. Examples of the method in the industrial context include roll stretching and hot-plate stretching.

In order to provide a porous film having high strength and excellent homogeneity and to provide a polymer electrolyte membrane having excellent strength, a small dimensional change, and a low membrane resistance, the stretch ratio in the biaxial stretching step is preferably 2 to 100 times, more preferably 10 to 50 times.

In order to provide a porous film having high strength and excellent homogeneity and to provide a polymer electrolyte membrane having excellent strength, a small dimensional change, and a low membrane resistance, the stretching temperature in the biaxial stretching step is preferably room temperature to 400° C., more preferably 150° C. to 390° C., still more preferably 200° C. to 380° C.

In order to provide a porous film having high strength and excellent homogeneity and to provide a polymer electrolyte membrane having excellent strength, a small dimensional change, and a low membrane resistance, the stretching rate in the biaxial stretching step is preferably 5 to 1000%/sec, more preferably 7 to 700%/sec, still more preferably 10 to 600%/sec.

In order to provide a porous film having high strength and excellent homogeneity and to provide a polymer electrolyte membrane having excellent strength, a small dimensional change, and a low membrane resistance, the production method preferably includes a heat-setting step after the biaxial stretching step. The heat-setting temperature is preferably 300° C. to 420° C., more preferably 350° C. to 400° C.

The biaxial stretching may be performed by any method, and may be performed by a method using a tenter, for example.

The porous film may be a uniaxially stretched porous film produced without biaxial stretching. Still, in order to achieve good impregnation of the electrolyte polymer, a biaxially stretched porous film is preferred.

The polymer electrolyte can be a known polymer used as a solid polymer electrolyte for polymer electrolyte fuel cells.

The polymer electrolyte may be any one, and is preferably a perfluorocarbon polymeric compound having an ion-exchange group or a hydrocarbon polymeric compound which has an aromatic ring in the molecule, which is partially fluorinated, and to which an ion-exchange group is introduced. For good chemical stability, a perfluorocarbon polymeric compound having an ion-exchange group is more preferred.

The polymer electrolyte preferably has an equivalent weight (EW), i.e., a dry weight per equivalent of the ion-exchange group, of 250 or more and 1500 or less.

The upper limit of the EW value is more preferably 900, still more preferably 700, particularly preferably 600, even more preferably 500.

The lower limit of the EW value is still more preferably 300, particularly preferably 350, even more preferably 400.

The EW value is preferably smaller because the conductivity becomes higher. In contrast, the solubility in hot water may be disadvantageously high. Thus, the EW value is preferably within the above appropriate range.

With a low-EW polymer electrolyte, the dimension of the polymer electrolyte membrane greatly changes, so that the durability tends to be poor in an environment at high temperature with a great humidity change, for example, in a fuel cell vehicle in operation. Since the polymer electrolyte membrane of the present invention comprises the above porous film, the dimension thereof is less likely to change and excellent durability and reliability can be achieved even with a low-EW polymer electrolyte.

The polymer electrolyte preferably has a proton conductivity of 0.10 S/cm or higher at 110° C. and a relative humidity of 80% RH. More preferably, the proton conductivity at 60% RH is 0.05 S/cm or higher, still more preferably the proton conductivity at 40% RH is 0.02 S/cm or higher, even more preferably the proton conductivity at 30% RH is 0.01 S/cm or higher.

The proton conductivity of the polymer electrolyte is preferably as high as possible. For example, the proton conductivity at 110° C. and a relative humidity of 50% RH may be 1.0 S/cm or lower.

The polymer electrolyte preferably satisfies a distance between ion clusters of 0.1 nm or longer and 2.6 nm or shorter at 25° C. and 50% RH. If the distance between ion clusters is 2.6 nm or shorter, the conductivity is drastically high.

The upper limit of the distance between ion clusters is more preferably 2.5 nm. The lower limit of the distance between ion clusters is more preferably 0.5 nm, still more preferably 1.0 nm, particularly preferably 2.0 nm.

For example, a fluoropolymer electrolyte satisfying a distance between ion clusters within the above range has a unique ion cluster structure.

The ion cluster means an ion channel formed by an aggregate of multiple proton exchange groups, and perfluoro-type proton exchange membranes, typified by Nafion, are considered to have such an ion cluster structure (for example, see Gierke, T. D., Munn, G. E., Wilson, F. C., J. Polymer Sci., Polymer Phys, 1981, 19, p.1687).

The distance d between ion clusters can be measured and calculated by the following method.

The produced fluoropolymer electrolyte is subjected to small-angle X-ray scattering measurement in an atmosphere of 25° C. and 50% RH. The resulting scattering intensities are plotted in relation to the Bragg angles θ, and the Bragg angle θm at the peak position derived from the cluster structure usually appearing at 2θ>1° is calculated. Based on the θm value, the distance d between ion clusters is calculated using the following formula (1):

$$d=\lambda/2/\sin(\theta m) \quad (1)$$

wherein λ represents an incident X-ray wavelength.

If the membrane is produced by casting, the membrane is annealed at 160° C. before the measurement. The fluoropolymer electrolyte is treated such that an end group to be mentioned later that is a COOZ group or a SO$_3$Z group is converted into COOH or SO$_3$H. The sample membrane is kept in an atmosphere at 25° C. and 50% RH for 30 minutes or longer before the measurement.

In the fluoropolymer electrolyte, the distance between ion clusters is short. Thus, protons are considered to easily move among the ion clusters, showing a high conductivity even at low humidity.

The polymer electrolyte is preferably a fluoropolymer electrolyte, and the fluoropolymer electrolyte is preferably one having a monomer unit that has a COOZ group or a SO$_3$Z group (wherein Z represents an alkali metal, an alkaline earth metal, hydrogen, or NR$^1$R$^2$R$^3$R$^4$, where R$^1$, R$^2$, R$^3$, and R$^4$ are each a C1-C3 alkyl group or hydrogen).

In the fluoropolymer electrolyte, the proportion of the COOZ or SO$_3$Z group-containing monomer unit is preferably 10 to 95 mol % in all the monomer units. The phrase "all the monomer units" herein means all the portions derived from monomers in the molecular structure of the fluoropolymer electrolyte.

The COOZ or SO$_3$Z group-containing monomer unit is typically derived from a COOZ or SO$_3$Z group-containing monomer represented by the following formula (I):

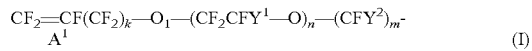

$$CF_2=CF(CF_2)_k-O_1-(CF_2CFY^1-O)_n-(CFY^2)_m- \atop A^1 \quad (I)$$

wherein Y$^1$ is F (a fluorine atom), Cl (a chlorine atom), or a perfluoroalkyl group; k is an integer of 0 to 2; l is 0 or 1; n is an integer of 0 to 8, n Y$^1$s may be the same as or different from each other; Y$^2$ is F or Cl; m is an integer of 0 to 12, if m=0, l=0 and n=0, m Y$^2$s may be the same as or different from each other; A$^1$ is COOZ or SO$_3$Z, where Z is an alkali metal, an alkaline earth metal, hydrogen, or NR$^1$R$^2$R$^3$R$^4$, where R$^1$, R$^2$, R$^3$, and R$^4$ are each a C1-C3 alkyl group or hydrogen.

In the formula (I), Y$^1$ is preferably F or —CF$_3$, more preferably F.

A$^1$ is preferably —SO$_3$Z, more preferably —SO$_3$H.

Preferably, m is an integer of 0 to 6.

For good synthesis and handleability, in the formula (I), k is more preferably 0; l is more preferably 1; and n is more preferably 0 or 1, still more preferably 0.

More preferably, $Y^2$ is F and m is an integer of 2 to 6, still more preferably $Y^2$ is F and m is 2 or 4, particularly preferably $Y^2$ is F and m is 2.

In the fluoropolymer electrolyte, one COOZ or $SO_3Z$ group-containing monomer may be used or two or more thereof may be used in combination.

The fluoropolymer electrolyte is preferably a copolymer including a repeating unit (α) derived from the COOZ or $SO_3Z$ group-containing monomer and a repeating unit (β) derived from an ethylenic fluoromonomer copolymerizable with the COOZ or $SO_3Z$ group-containing monomer.

The ethylenic fluoromonomer to constitute the repeating unit (β) is a monomer that is free from ether oxygen (—O—) and has a vinyl group, and part or all of the hydrogen atoms in the vinyl group may optionally be replaced by fluorine atoms.

The term "ether oxygen" herein means an —O— structure constituting the monomer molecule.

Examples of the ethylenic fluoromonomer include haloethylenic fluoromonomers represented by the following formula (II):

$$CF_2=CF—Rf^1 \tag{II}$$

(wherein $Rf^1$ represents F, Cl, or a C1-C9 linear or branched fluoroalkyl group), or hydrogen-containing fluoroethylenic fluoromonomers represented by the following formula (III):

$$CHY^3=CFY^4 \tag{III}$$

(wherein $Y^3$ represents H or F, and $Y^4$ represents H, F, Cl, or a C1-C9 linear or branched fluoroalkyl group).

The ethylenic fluoromonomer may be tetrafluoroethylene (TFE), hexafluoropropylene (HFP), chlorotrifluoroethylene (CTFE), vinyl fluoride, vinylidene fluoride (VDF), trifluoroethylene, hexafluoroisobutylene, perfluorobutylethylene, or the like. It is preferably TFE, VDF, CTFE, trifluoroethylene, vinyl fluoride, or HFP, more preferably TFE, CTFE, or HFP, still more preferably TFE or HFP, particularly preferably TFE. One of the ethylenic fluoromonomers may be used or two or more thereof may be used in combination.

The fluoropolymer electrolyte is preferably a copolymer comprising 10 to 95 mol % of the repeating unit (α) derived from the COOZ or $SO_3Z$ group-containing monomer, 5 to 90 mol % of the repeating unit (β) derived from the ethylenic fluoromonomer, with the sum of the proportions of the repeating unit (α) and the repeating unit (β) being 95 to 100 mol %.

The lower limit of the proportion of the repeating unit (α) derived from the COOZ or $SO_3Z$ group-containing monomer is more preferably 15 mol %, still more preferably 20 mol %, whereas the upper limit thereof is more preferably 60 mol %, still more preferably 50 mol %.

The lower limit of the proportion of the repeating unit (β) derived from the ethylenic fluoromonomer is more preferably 35 mol %, still more preferably 45 mol %, whereas the upper limit thereof is more preferably 85 mol %, still more preferably 80 mol %.

The fluoropolymer electrolyte is preferably a copolymer containing a repeating unit derived from the COOZ or $SO_3Z$ group-containing monomer represented by the formula (I) and a repeating unit derived from TFE.

The fluoropolymer electrolyte may contain, as a repeating unit derived from a third monomer other than the above components, a repeating unit (γ) derived from vinyl ether other than the COOZ or $SO_3Z$ group-containing monomer, and the proportion thereof is preferably 0 to 5 mol %, more preferably 4 mol % or less, still more preferably 3 mol % or less.

The polymer composition of the fluoropolymer electrolyte can be calculated from the measured value in melt-state NMR at 300° C., for example.

The vinyl ether other than the COOZ or $SO_3Z$ group-containing monomer to constitute the repeating unit (γ) may be any one containing neither the COOZ group nor the $SO_3Z$ group, and examples thereof include fluorovinyl ethers represented by the following formula (IV):

$$CF_2=CF—O—Rf^2 \tag{IV}$$

(wherein $Rf^2$ represents a C1-C9 fluoroalkyl group or a C1-C9 fluoropolyether group), more preferably perfluorovinyl ether, or hydrogen-containing vinyl ethers represented by the following formula (V):

$$CHY^5=CF—O—Rf^3 \tag{V}$$

(wherein $Y^5$ represents H or F, and $Rf^3$ represents a C1-C9 linear or branched fluoroalkyl group that may optionally have an ether group). One of the vinyl ethers may be used or two or more thereof may be used.

The polymer electrolyte can be produced by any conventionally known method. For example, the polymer electrolyte can be produced by the method disclosed in WO 2009/116446 A1.

The polymer electrolyte membrane of the present invention preferably has a thickness of 1 µm or larger and 500 µm or smaller, more preferably 2 µm or larger and 100 µm or smaller, still more preferably 5 µm or larger and 50 µm or smaller. Too thin a polymer electrolyte membrane can have a low DC resistance, but may disadvantageously allow a large amount of gas to permeate. Thus, the thickness thereof is preferably within the above appropriate range.

The polymer electrolyte membrane of the present invention can be made thin while maintaining the excellent durability thereof by the use of the above porous film.

Next, a method for producing the polymer electrolyte membrane of the present invention will be described below. (Production Method for Polymer Electrolyte Membrane)

The polymer electrolyte membrane of the present invention can be produced by immersing the porous film into a polymer electrolyte solution to be mentioned later or applying the polymer electrolyte solution to the porous film. The immersion or the application is preferably followed by drying.

Examples of the immersion method include dip coating.

Examples of the application method include a slot die technique, and coating techniques disclosed in JP H11-501964 T, such as forward roll coating, reverse roll coating, gravure coating, knife coating, kiss coating, and spray coating. The coating technique can be appropriately selected from these techniques in accordance with the thickness of a layer of the coating liquid to be formed, the material properties of the coating liquid, coating conditions, and the like.

The drying removes a solvent constituting the polymer electrolyte solution. The drying may be performed at room temperature or under heating.

The drying is preferably performed under heating, preferably under heating at 50° C. to 350° C., for example.

One example of a more specific method for producing the polymer electrolyte membrane of the present invention is a method including: forming a film of a polymer electrolyte solution on a long and narrow casting substrate (sheet) in a state of moving or being left to stand; bringing a long and narrow porous film into contact with the solution to form an unfinished composite structure; drying the unfinished composite structure in, for example, a hot-air circulating chamber; and forming another film of the polymer electrolyte solution on the dried unfinished composite structure to provide a polymer electrolyte membrane.

In order to improve the conductivity and the mechanical strength of the polymer electrolyte membrane, one or more layers containing a polymer electrolyte may be formed on at least one main surface of the thus-produced polymer electrolyte membrane.

Further, the compounds contained therein may be cross-linked with each other by means of a cross-linker, ultraviolet rays, electron beams, radial rays, or the like.

(Polymer Electrolyte Solution)

The polymer electrolyte solution can be produced by dissolving or suspending the polymer electrolyte in an appropriate solvent (a solvent having good affinity with resin).

Examples of an appropriate solvent include water, protonic organic solvents such as ethanol, methanol, n-propanol, isopropyl alcohol, butanol, and glycerol, and aprotic solvents such as N,N-dimethylformamide, N,N-dimethylacetamide, and N-methylpyrrolidone. One of these may be used alone or two or more of these may be used in combination. If one solvent is used alone, water is preferred. If two or more solvents are used in combination, a solvent mixture of water and a protonic organic solvent is particularly preferred.

The dissolution or suspension may be achieved by any method. For example, the polymer electrolyte is first added to a solvent mixture of water and a protonic organic solvent such that the total solid content is 1 to 50 mass %. Next, this composition is put into an autoclave having a glass inner cylinder, if necessary, and the atmosphere inside the cylinder is purged with inert gas such as nitrogen. Then, the system is heated under stirring for 1 to 12 hours at an internal temperature of 50° C. to 250° C. Thereby, a solution or a suspension is obtained. The total solid content is preferably as high as possible for higher yield. Still, too high a concentration may cause undissolved matter. Thus, the total solid content is preferably 1 to 50 mass %, more preferably 3 to 40 mass %, still preferably 5 to 30 mass %.

If a protonic organic solvent is used, the ratio between water and the protonic organic solvent can be appropriately selected in accordance with the dissolving method, the dissolving conditions, the type of the polymer electrolyte, the total solid content, the dissolving temperature, the stirring speed, and the like. The mass ratio of the protonic organic solvent to water is preferably 0.1 to 10 of protonic organic solvent to 1 of water, particularly preferably 0.1 to 5 of the organic solvent to 1 of water.

Such a solution or suspension includes one or two or more of emulsion (in which liquid particles are dispersed as colloidal particles or more coarse particles in liquid to be in the state of emulsion), suspension (in which solid particles are dispersed as colloidal particles or particles having a size to be observed through a microscope in liquid), colloidal liquid (in which macromolecules are dispersed), micellar liquid (which is a lyophilic colloids dispersion formed by association of many small molecules by intermolecular force), and the like.

Also, such a solution or suspension can be concentrated. The concentration may be achieved by any method. Examples thereof include a method of heating the solution or suspension to evaporate the solvent and a method of concentrating the solution or suspension under reduced pressure. If the resulting coating solution has too high a solid concentration, it may have a high viscosity and be difficult to handle. If the resulting coating solution has too low a solid concentration, the productivity thereof may be poor. Thus, the final solid concentration of the coating solution is preferably 0.5 to 50 mass %.

In order to remove coarse particles, the resulting solution or suspension is more preferably filtered. The filtration may be performed by any method, such as conventionally performed usual methods. One typical example of the method is pressure filtration using a filter obtained by processing a filter material having a filtration rating usually used. The filter is preferably a filter material whose 90% capture particle size is 10 to 100 times the average particle size of the particles. This filter material may be filter paper or may be a filter material such as a metal-sintered filter. In the case of filter paper, the 90% capture particle size thereof is preferably 10 to 50 times the average particle size of the particles. In the case of a metal-sintered filter, the 90% capture particle size thereof is preferably 50 to 100 times the average particle size of the particles. Adjusting the 90% capture particle size to 10 or more times the average particle size possibly enables suppression of an excessive increase in a pressure for liquid delivery and suppression of filter clogging in a short time. In contrast, adjusting the 90% capture particle size to 100 or less times the average particle size is preferred in order to favorably remove aggregates of the particles or undissolved resin that may cause foreign matters in the resulting film.

The membrane electrode assembly of the present invention comprises the polymer electrolyte membrane. A unit comprising an electrolyte membrane and two electrode catalyst layers that are an anode and a cathode and joined to the respective surfaces of the membrane is called a membrane electrode assembly (hereinafter, also abbreviated as "MEA"). The MEA may also include those prepared by oppositely joining a pair of gas diffusion layers to the outer surfaces of the electrode catalyst layers.

The electrode catalyst layers each comprise fine particles of a catalyst metal and a conducting agent carrying the catalyst metal, and a water repellant, if necessary. The catalyst used for the electrodes may be any metal that promotes oxidation of hydrogen and reduction of oxygen, and examples thereof include platinum, gold, silver, palladium, iridium, rhodium, ruthenium, iron, cobalt, nickel, chromium, tungsten, manganese, vanadium, and any alloy thereof. In particular, platinum is mainly used.

The amount of the electrode catalyst supported relative to the electrode area is, in the form of an electrode catalyst layer, preferably 0.001 to 10 mg/cm$^2$, more preferably 0.01 to 5 mg/cm$^2$, most preferably 0.1 to 1 mg/cm$^2$.

The resulting MEA, in some cases the MEA with a pair of gas diffusion electrodes disposed on the opposite sides, is combined with constitutional elements used in usual polymer electrolyte fuel cells, such as a bipolar plate and a backing plate, and thereby a polymer electrolyte fuel cell is produced. The present invention also relates to a polymer electrolyte fuel cell comprising the membrane electrode assembly.

The bipolar plate means a plate of a composite material of graphite and resin or a plate of metal, having on a surface thereof a channel for flowing fuel or gas such as an oxidizing agent. The bipolar plate has not only a function of delivering electrons to an external load circuit but also a function as a channel for supplying fuel or an oxidizing agent to the vicinity of the electrode catalyst. Intercalation of an MEA between such bipolar plates and the resulting stack of multiple layers lead to a fuel cell.

EXAMPLES

In examples, the respective physical properties are determined by the following methods.

(1) Polymer Solid Concentration

Polytetrafluoroethylene aqueous dispersion (1 g) is dried at 150° C. for 30 minutes in a blowing dryer. The percentage of the mass of the nonvolatile matter to the mass (1 g) of the aqueous dispersion is defined as a polymer solid concentration.

(2) Average Primary Particle Size

A polytetrafluoroethylene aqueous dispersion is diluted with water to have a solid concentration of 0.15 mass %. Then, the transmittance of incident light at 550 nm relative to the unit length of the resulting diluted latex is determined and the number-based length average particle size is determined by measuring the Feret diameter in a transmission electron micrograph. Based on these values, a calibration curve is drawn. Using this calibration curve, the average primary particle size is determined from the measured transmittance of incident light at 550 nm of each sample.

(3) Amount of Trace Comonomer (Ethylenic Comonomer (PMVE))

PTFE fine powder was molten at high temperature and was subjected to $F^{19}$-NMR measurement. The amount of the trace comonomer was calculated from the signals assigned to functional groups in the resulting trace comonomer.

For example, the amount of PMVE used in the examples of the present application was calculated by $F^{19}$-NMR measurement at 360° C. using the following formula:

$$\text{Amount of trace comonomer(mol \%)} = (4B/3)/(A+(B/3)) \times 100$$

wherein A=sum of $CF_2$ signal and CF signal around −118 ppm; and B=integral value of $CF_3$ signal assigned to PMVE around −52 ppm.

(4) Standard Specific Gravity (SSG) of PTFE

A sample is produced in conformity with ASTM D4895-89, and the specific gravity of the resulting sample is measured by the water replacement method.

(5) Extrusion Pressure

First, 100 g of PTFE fine powder is left to stand at room temperature for two hours or longer. The powder is blended with 21.7 g of a lubricant (trade name: Isopar H (registered tradename), product of Exxon Mobil Corp.) for three minutes. Thereby, a PTFE fine powder mixture is obtained.

The resulting PTFE fine powder mixture is left to stand for two hours in a 25° C. temperature-constant chamber, and then paste-extruded through an orifice (diameter: 2.5 mm, land length: 1.1 cmm, introduction angle: 30°) at a reduction ratio (ratio between the cross-section area of the inlet of the die and the cross-section area of the outlet thereof) of 100 and an extrusion rate of 51 cm/min at 25° C. Thereby, beading is obtained.

The extrusion pressure is a value determined by measuring a load when the extrusion load reaches equilibrium during the paste extrusion, and then dividing the measured load by the cross-section area of a cylinder used in the paste extrusion.

(6) Grammage

The mass (g) of a rectangular sample with a size of 4.0 cm×12.0 cm is measured using a precision scale, and the mass is divided by the area (0.0048 m$^2$). The quotient is defined as the grammage.

(7) Film Density

The mass of a rectangular sample with a size of 4.0 cm×12.0 cm is measured using a precision scale. Using the measured mass and the thickness, the film density is calculated by the following formula:

$$\rho = M/(4.0 \times 12.0 \times t)$$

wherein
$\rho$=film density (g/cm$^3$)
M=mass (g)
t=thickness (cm).

The measurement and the calculation are performed at three points, and the average value thereof is defined as the film density.

(8) Porosity

The porosity is determined by the following formula using the film density and the PTFE true density (2.2 g/cm$^3$):

$$\text{Porosity} = 1 - (\text{film density/PTFE true density})$$

wherein the PTFE true density is 2.2 g/cm$^3$.

(9) Thickness

Five biaxially stretched porous films are stacked and the total thickness is measured using a thickness meter, and the measured value is divided by 5. The quotient is defined as the thickness of one biaxially stretched porous film.

(10) Matrix Tensile Strengths (Vertical and Lateral)

Based on the vertical matrix tensile strength and the lateral matrix tensile strength determined by the following methods, the "product of vertical and lateral matrix tensile strengths" is determined.

(Vertical Matrix Tensile Strength)

First, five samples were cut out of a biaxially stretched porous film. Each sample has a dimension of 15.0 cm in the machine direction (longitudinal direction, i.e., paste extruding direction) and 2.0 cm in the transverse direction (width direction, i.e., direction perpendicular to the paste extruding direction). For the five samples, the tensile strength in the machine direction was measured, and the maximum loads of the respective five samples were determined.

Next, the largest one and the smallest one of the maximum loads of the five samples were eliminated and an average value of the remaining three values was calculated. This average value was defined as the vertical average maximum load.

The vertical matrix tensile strength is determined by the following formula using the vertical average maximum load, the sample width (2.0 cm), the thickness (unit: cm), and the porosity.

$$\text{Vertical matrix tensile strength} = \{(\text{vertical average maximum load})/(2.0 \times \text{thickness})\}/(1-\text{porosity}).$$

(Lateral Matrix Tensile Strength)

Five samples were cut out of a biaxially stretched porous film. Each sample has a dimension of 2.0 cm in the machine direction (longitudinal direction, i.e., paste extruding direction) and 15.0 cm in the transverse direction (width direction, i.e., direction perpendicular to the paste extruding direction). For the five samples, the tensile strength in the transverse direction was measured, and the maximum loads of the respective five samples were determined.

Next, the lateral average maximum load was calculated in the same manner as in the case of the machine direction, and the lateral matrix tensile strength was determined using the following formula:

$$\text{Lateral matrix tensile strength} = \{(\text{lateral average maximum load})/(2.0 \times \text{thickness})\}/(1-\text{porosity}).$$

In the tensile strength measurement, a tensile tester equipped with a 50 N load cell is used at a chuck length of 5.0 cm and a cross-head speed of 300 mm/min.

(11) Average Pore Size

The mean flow pore size (MFP) measured in conformity with ASTM F316-86 was defined as the average pore size.

(12) Vertical Strength and (13) Lateral Strength

The film sample was cut into a rectangular film having a size of 70 mm in the longitudinal (vertical) direction×10 mm in the width (lateral) direction, and the tensile strength thereof was measured in conformity with JIS K7127.

(14) Vertical Dimensional Change and (15) Lateral Dimensional Change

The film sample was cut into a rectangular film having a size of 4 cm×3 cm, and the cut film was left to stand in a constant-temperature constant-humidity chamber (23° C., 50% RH) for one hour or longer. The dimensions in the plane directions of the dried rectangular film sample were measured. Next, the measured rectangular film sample was boiled in 80° C. hot water for one hour and the sample was made to sufficiently absorb water such that the electrolyte membrane was wet enough to have a mass change due to water of 5% or lower (such that the volume swelling due to water absorption was saturated). At this time, the membrane was taken out of the hot water and the moisture on the surface was sufficiently removed, and then the mass change was confirmed to be 5% or lower using an electronic scale. This wet film sample swelling by absorbing water was taken out of the hot water, and the dimensions in the plane directions (i.e., the longitudinal (vertical) direction and the width (lateral) direction) were measured. Based on the dry dimensions in the plane directions, an average of the increments of the respective wet dimensions in the plane directions from the dry dimensions was calculated. This average was taken as the dimensional change (%).

(16) Membrane Resistance

In order to determine the membrane resistance of an electrolyte membrane that is a composite of the microporous film under high-temperature and low-humidity conditions, a battery performance test was performed as follows.

(16)-1 Preparation of Electrode Catalyst Ink

A 20 mass % perfluorosulfonic acid polymer solution (SS700C/20, product of Asahi Kasei Corp., equivalent mass (EW): 740) and an electrode catalyst (TEC10E40E, product of Tanaka Kikinzoku Hanbai K.K., platinum amount: 36.7 wt %) were blended at a platinum/perfluorosulfonic acid polymer ratio of 1/1.15 (mass). Then, ethanol was added thereto so that the solids content (sum of the amounts of the electrode catalyst and the perfluorosulfonic acid polymer) was 11 wt %. The mixture was stirred using a homogenizer (product of As One Corp.) at 3,000 rpm for 10 minutes. Thereby, an electrode catalyst ink was obtained.

(16)-2 Production of MEA

The electrode catalyst ink was applied to both surfaces of the polymer electrolyte membrane using an automatic screen printer (trade name: LS-150, product of Newlong Seimitsu Kogyo Co., Ltd.) such that the platinum amount on the anode side was 0.2 mg/cm$^2$ and the platinum amount on the cathode side was 0.3 mg/cm$^2$, and then the ink was dried and solidified at 140° C. for five minutes. Thereby, a MEA was obtained.

(16)-3 Production of single fuel cell

Gas diffusion layers (trade name: GDL35BC, product of MFC Technology) were stacked on the respective electrodes of the MEA, and then gaskets, bipolar plates, and backing plates were stacked thereon. Thereby, a single fuel cell was obtained.

(16)-4 Measurement of Membrane Resistance

The single fuel cell was mounted on an evaluation device (fuel cell evaluation system 890CL, product of Toyo Corp.), and the membrane resistance was measured.

The battery performance test was performed at a cell temperature of 90° C. and a humidifying bottle temperature of 60° C. (30% RH), with hydrogen gas supplied to the anode and air gas supplied to the cathode at a gas utilization rate of, respectively, 70% and 40%. Both the anode and the cathode were not pressurized (under atmospheric pressure). A current of 0 A to 20 A was applied, and the resistance value at that time was measured.

(Power Generation Characteristics of Fuel Cell)

The evaluation of the membrane electrode assembly was performed using a polymer electrolyte fuel cell (single cell).

A single cell was mounted on a fuel cell evaluation device (automatic fuel cell evaluation system, product of TOYO Corp.), and a power generation test was performed using hydrogen gas as a fuel and air gas as an oxidizing agent under the following high-temperature high-humidity condition and high-temperature and low-humidity condition. Using a cell voltage at a current density of 0.25 A/cm$^2$, the power generation characteristics were evaluated.

—High Humidity Condition

Normal pressure, cell temperature: 80° C., hydrogen gas humidifying temperature: 80° C., air gas humidifying temperature: 80° C., hydrogen gas utilization rate: 75%, air gas utilization rate: 55%.

—Low Humidity Condition

Normal pressure, cell temperature: 80° C., hydrogen gas humidifying temperature: 60° C., air gas not humidified, hydrogen gas utilization rate: 75%, air gas utilization rate: 55%.

Production Example 1

A 6-L stainless steel (SUS316) autoclave provided with a stainless steel (SUS316) anchor stirrer and a temperature control jacket was charged with 3560 ml of deionized water, 104 g of paraffin wax, and 5.4 g of $CF_3OCF(CF_3)CF_2OCF(CF_3)COONH_4$ serving as a fluorosurfactant. The system was purged with nitrogen gas three times and with TFE gas twice under heating up to 70° C., so that oxygen was removed. Then, the pressure inside the container was adjusted to 0.60 MPa by TFE gas, the contents were stirred at 250 rpm, and the temperature inside the container was maintained at 70° C.

Next, 0.60 g (if the whole amount was reacted, this amount corresponds to 0.029 mol % (0.049 mass %) based on the whole amount of TFE to be polymerized) of perfluoromethyl vinyl ether (PMVE) was injected with TFE so that the pressure inside the container of the autoclave was adjusted to 0.70 MPa.

An aqueous solution of ammonium persulfate (15.4 mg) in deionized water (20 ml) was injected with TFE so that the pressure inside the container of the autoclave was adjusted to 0.78 MPa, and the polymerization reaction was started.

The pressure inside the container decreased as the polymerization reaction proceeded. Thus, TFE was continually supplied so as to always maintain the pressure inside the container of the autoclave at 0.78±0.05 MPa. The temperature inside the container was maintained at 70° C. and the stirring speed was maintained at 250 rpm.

When 429 g (35.0 mass % relative to the whole amount (1225 g) of TFE to be polymerized) of TFE was consumed, an aqueous solution of hydroquinone (14.32 mg (4.0 ppm relative to the aqueous medium)) serving as a radical scavenger in deionized water (20 ml) was injected with TFE.

The polymerization was further continued. When 1225 g of TFE was consumed, the stirring and the supply of the monomer were stopped. The gas inside the autoclave was immediately released to normal pressure and the reaction was finished. Thereby, an aqueous dispersion A of modified PTFE was obtained.

A trace of the polymer coagulum was observed in the polymerization container.

For the resulting aqueous dispersion, the polymer solid concentration and the average primary particle size were determined. Table 1 shows the measurement results.

Next, a 6-L stainless steel (SUS316) coagulation tank provided with a stainless steel (SUS316) stirrer, a baffle, and a temperature control jacket was charged with 3 L of the PTFE aqueous dispersion A prepared by filtering off paraffin and being diluted with deionized water so as to have a polymer solid concentration of 14 wt %.

The temperature was controlled so that the temperature of the contents was 16° C., and the stirring was started (at 450 rpm).

At this time, 3 g of a 10 wt % aqueous solution of ammonium hydrogen carbonate used as a neutralizer was put into the coagulation tank. When the polymer powder was separated from water, the stirring was stopped. The resulting wet powder was filtered, and the residue was washed with 3 L of deionized water.

This washing process was repeated twice, and the residue was then dried for 18 hours in a hot-air circulating dryer set to 160° C. Thereby, a modified PTFE fine powder A (PTFE-A) was obtained.

The amount of PMVE, SSG, and extrusion pressure at RR100 were measured and evaluated. Table 1 shows the results.

Production Example 2

A homo-PTFE fine powder B (PTFE-B) was obtained in conformity with Comparative Example 3 of WO 2005/061567 A1 except that the drying temperature was changed to 160° C.

For the resulting PTFE-B, the parameters were measured and evaluated. Table 1 shows the results.

Production Example 3

A homo-PTFE fine powder C (PTFE-C) was obtained in accordance with Example 2 of WO 2010/113950 A1.

For the resulting PTFE-C, the respective parameters were measured and evaluated. Table 1 shows the results.

Production Examples 4 to 8

PTFE-D to PTFE-H were produced in the same manner as in Production Example 1. Production Example 8 alone used perfluorobutylethylene (PFBE) as a comonomer.

Example 1

Extrusion and Rolling

Hydrocarbon oil ("IP Solvent 2028", product of Idemitsu Kosan Co., Ltd.), serving as an extrusion aid, at 20° C. was added in an amount of 28 parts by weight for each 100 parts by weight of the modified PTFE fine powder A (PTFE-A) obtained in Production Example 1. The components were mixed and the mixture was left to stand for 12 hours in a 40° C. electric furnace, so that the extrusion aid was allowed to sufficiently permeate into the powder.

Next, the resulting mixture was extruded through a paste extruder into a sheet-shaped molded article. The tip of the paste extruder was equipped with a sheet die having a rectangular orifice with a dimension of 2 mm in the width direction×150 mm in the longitudinal direction. The resulting sheet-like molded article was molded into a film shape using a calendar roll heated up to 70° C., and thereby a PTFE film was obtained. This film was passed through a hot-air drying furnace so that the hydrocarbon oil was evaporated, and thereby a belt-like non-sintered PTFE film having an average thickness of 300 μm and an average width of 150 mm was obtained.

(Uniaxial Stretching)

The resulting non-sintered PTFE film was stretched in the longitudinal direction at a stretch ratio of 15 times and a stretching rate of 40%/sec using a stretching device equipped with multiple rolls illustrated in FIG. 1. The stretching temperature was 250° C.

(Biaxial Stretching)

Figure 2:
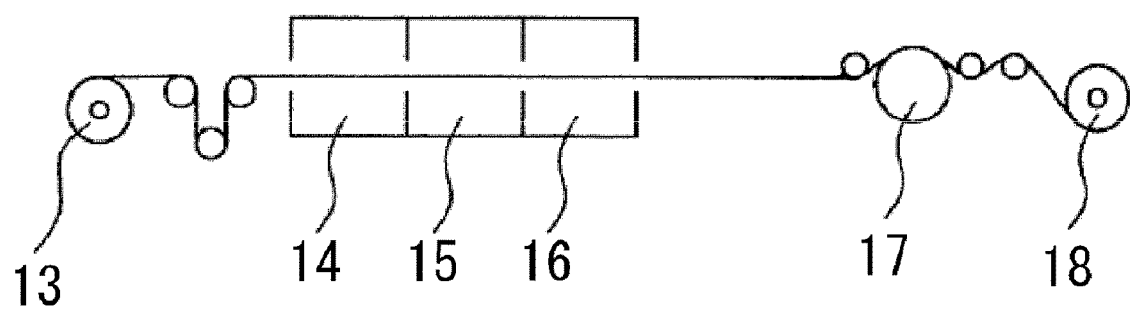
FIG. 2 is a schematic cross-section view of a tenter stretching device used in the examples.

The uniaxially stretched non-sintered film was stretched in the width direction at a stretch ratio of 43 times and a line speed of 10 m/min using a tenter capable of continuous clipping illustrated in FIG. 2, and the film was heat-set (biaxial stretching). At this time, the stretching temperature was 295° C. and the heat-setting temperature was 340° C. The physical properties (grammage, film density, thickness, matrix tensile strengths, average pore size) of the resulting porous film were evaluated. Table 2 shows the results.

(Production of Polymer Electrolyte Solution)

First, a precursor polymer of the polymer electrolyte, that is, precursor pellets (ion exchange volume after hydrolysis and acid treatment: 1.4 mEq/g) of perfluorosulfonic acid resin formed from tetrafluoroethylene and $CF_2=CFO(CF_2)_2-SO_2F$ were prepared. Next, the precursor pellets were brought into contact with an aqueous solution containing potassium hydroxide (15 mass %) and methyl alcohol (50 mass %) dissolved therein at 80° C. for 20 hours, so that the pellets were hydrolyzed. Then, the pellets were immersed in 60° C. water for five hours. Next, the pellets after immersed in water were immersed in 60° C. 2 N hydrochloric acid for one hour. This treatment was repeated five times, with the

TABLE 1

| Parameter | Unit | Production Example 1 | Production Example 2 | Production Example 3 | Production Example 4 | Production Example 5 | Production Example 6 | Production Example 7 | Production Example 8 |
|---|---|---|---|---|---|---|---|---|---|
| Polymer name | — | PTFE-A | PTFE-B | PTFE-C | PTFE-D | PTFE-E | PTFE-F | PTFE-G | PTFE-H |
| Polymer solid concentration | Mass % | 25.4 | 25.6 | 30.9 | 27.2 | 26.9 | 26.0 | 26.8 | 35.0 |
| Average primary particle size | nm | 234 | 320 | 339 | 315 | 247 | 284 | 232 | 220 |
| Trace comonomer | — | PMVE | — | — | PMVE | PMVE | PMVE | PMVE | PFBE |
| Amount of trace comonomer | Mol % | 0.028 | — | — | 0.011 | 0.016 | 0.035 | 0.091 | 0.030 |
| Standard specific gravity (SSG) | — | 2.145 | 2.158 | 2.152 | 2.143 | 2.147 | 2.144 | 2.136 | 2.145 |
| Extrusion pressure | MPa | 16.3 | 15.8 | 19.1 | 15.2 | 18.1 | 17.5 | 17.8 | 19.2 | hydrochloric acid replaced by a new one in every treatment. Thereafter, the pellets repeatedly immersed in hydrochloric acid were washed with deionized water and dried. Thereby, a perfluorocarbon sulfonic acid resin (PFSA), which is the polymer electrolyte, was obtained.

These pellets were put into a 5-L autoclave together with an ethanol aqueous solution (water:ethanol=50.0/50.0 (mass ratio)) and the autoclave was sealed. The temperature was increased up to 160° C. while the contents were stirred with a stirrer, and the system was maintained for five hours. Then, the autoclave was naturally cooled, and thereby a uniform perfluorocarbon sulfonic acid resin solution with a solids content of 5 mass % was obtained. This solution was vacuum-concentrated at 80° C. and diluted with water and ethanol. Thereby, a solution of ethanol:water=60:40 (mass ratio) having a viscosity of 500 cP and a solids content of 15.0 mass % was prepared. This solution was treated as Solution 1.

(Production of Polymer Electrolyte Membrane)

The Solution 1 was applied to a base film using a bar coater (bar No. 200, product of Matsuo Sangyo Co., Ltd., wet thickness: 200 μm) (applied area: about 200 mm width× about 500 mm length). Before the Solution 1 was completely dried, the PTFE porous film obtained by the above biaxial stretching (thickness: 2.0 μm, film density: 0.475%, sample size: 200 mm width×500 mm length) was stacked on the Solution 1, and the Solution 1 and the microporous film were press-bonded using a rubber roll on the microporous film. At this time, partial filling of the solution into the microporous film was visually confirmed. This film was dried in a 90° C. oven for 20 minutes. Next, the Solution 1 was again stacked on the PTFE microporous film of the resulting film in the same manner, so that the pores of the microporous film were sufficiently filled with the Solution 1. This film was further dried in a 90° C. oven for 20 minutes. The "PTFE microporous film sufficiently impregnated with the Solution 1" thus obtained was heat-treated in a 170° C. oven for one hour. Thereby, a polymer electrolyte membrane having a thickness of about 25 μm was obtained. Table 2 shows the results of evaluating the polymer electrolyte membrane.

Example 2 and Comparative Examples 1 to 3

A porous film was obtained by the same processing as in Example 1 except that the type of the PTFE material, the amount of the extrusion aid (hydrocarbon oil), the ratio and temperature of the uniaxial stretching, and the thermosetting temperature were changed as shown in Table 2. The physical properties were measured in the same manner as in Example 1. Table 2 shows the results. Further, a polymer electrolyte membrane was obtained in the same manner as in Example 1 except that the porous film obtained in the corresponding example or comparative example was used. Table 2 shows the results of evaluating the polymer electrolyte membranes.

Example 3

A porous film was obtained by the same processing as in Example 1 except that the amount of the extrusion aid (hydrocarbon oil) was changed to 30 parts by weight, the ratio of the uniaxial stretching was changed to 16 times, the temperature of the uniaxial stretching was changed to 300° C., the line speed of the biaxial stretching was changed to 9 m/min, and the thermosetting temperature was changed to 380° C. The physical properties were measured in the same manner as in Example 1. Table 2 shows the results. Further, a polymer electrolyte membrane was obtained in the same manner as in Example 1 except that the resulting porous film was used. Table 2 shows the results of evaluating the polymer electrolyte membrane.

Example 4

A non-sintered porous film was obtained by extrusion and rolling in the same manner as in Example 1 except that the amount of the extrusion aid (hydrocarbon oil) was changed to 26 parts by weight. The resulting non-sintered PTFE film was immersed in a salt bath controlled to 330° C. for 70 seconds to be heat-treated. Thereby, a semi-sintered PTFE film was obtained. Next, the resulting semi-sintered PTFE film was processed into a porous film in the same manner as in Example 1 except that the ratio and temperature of the uniaxial stretching, the temperature of the biaxial stretching, and the thermosetting temperature were changed as shown in Table 2. The physical properties were measured in the same manner as in Example 1. Table 2 shows the results. Further, a polymer electrolyte membrane was obtained in the same manner as in Example 1 except that the resulting porous film was used. Table 2 shows the results of evaluating the polymer electrolyte membrane.

TABLE 2

| | Parameter | Unit | Example 1 | Example 2 | Example 3 | Example 4 | Comparative Example 1 | Comparative Example 2 | Comparative Example 3 |
|---|---|---|---|---|---|---|---|---|---|
| Extrusion | PTFE material | — | PTFE-A | PTFE-A | PTFE-A | PTFE-A | PTFE-B | PTFE-B | PTFE-C |
| | Extrusion aid | Parts by weight | 28 | 28 | 30 | 26 | 26 | 26 | 26 |
| | Extrusion pressure | MPa | 12.5 | 12.5 | 10.9 | 14.9 | 11.5 | 11.5 | 18.2 |
| Rolling | Average thickness | μm | 300 | 300 | 300 | 300 | 300 | 300 | 300 |
| Semi-sintering | Heat-treating temperature | ° C. | — | — | — | 330 | — | — | — |
| | Treating time | Sec | — | — | — | 70 | — | — | — |
| Uniaxial stretching | Stretch ratio | Times | 15 | 10 | 16 | 10 | 12 | 20 | 12 |
| | Stretching rate | %/sec | 40 | 40 | 40 | 40 | 40 | 40 | 40 |
| | Stretching temperature | ° C. | 250 | 250 | 300 | 300 | 300 | 300 | 250 |
| Biaxial stretching | Stretch ratio | Times | 43 | 43 | 43 | 43 | 43 | 43 | 43 |
| | Line speed | m/min | 10 | 10 | 9 | 10 | 10 | 10 | 10 |
| | Stretching temperature | ° C. | 295 | 295 | 295 | 380 | 295 | 295 | 295 |
| | Heat-setting temperature | ° C. | 340 | 340 | 380 | 390 | 340 | 340 | 340 |
| Physical properties of porous film | Grammage | g/m$^2$ | 0.95 | 1.84 | 0.83 | 2.33 | 2.71 | 0.80 | 2.33 |
| | Film density | g/cm$^2$ | 0.475 | 0.460 | 0.415 | 0.583 | 0.511 | 1.333 | 0.466 |
| | Film thickness | μm | 2.0 | 4.0 | 2.0 | 4.0 | 5.3 | 0.6 | 5.0 |
| | Matrix tensile strength (vertical) | MPa | 284 | 153 | 278 | 179 | 104 | 180 | 139 |

TABLE 2-continued

| | Parameter | Unit | Example 1 | Example 2 | Example 3 | Example 4 | Comparative Example 1 | Comparative Example 2 | Comparative Example 3 |
|---|---|---|---|---|---|---|---|---|---|
| | Matrix tensile strength (lateral) | MPa | 170 | 139 | 162 | 178 | 147 | 90 | 148 |
| | Product of Matrix tensile strengths (vertical × lateral) | $10^4 \times (MPa)^2$ | 4.83 | 2.13 | 4.50 | 3.19 | 1.52 | 1.62 | 2.05 |
| | Average pore size | μm | 0.428 | 0.409 | 0.503 | 0.412 | 0.414 | 0.211 | 0.164 |
| Physical properties of electrolyte membrane | Vertical strength (Dry tensile (25° C., 50%)) | (MPa) | 37.3 | 46.3 | 50.1 | 42.0 | 25.8 | 31.3 | 33.4 |
| | Lateral strength (Dry tensile (25° C., 50%)) | (MPa) | 34.9 | 43.1 | 48.2 | 37.2 | 21.7 | 27.8 | 30.7 |
| | Vertical dimensional change (80° C., immersed in hot water) | (%) | 12.1 | 6.3 | 3.0 | 9.0 | 22.3 | 17.4 | 18.5 |
| | Lateral dimensional change (80° C., immersed in hot water) | (%) | 10.8 | 4.3 | 2.0 | 7.2 | 16.9 | 13.2 | 12.1 |
| | Membrane resistance | (mΩ) | 10.3 | 9.7 | 9.6 | 11.3 | 10.1 | 10.7 | 11.5 |

Examples 5 to 8

A non-sintered PTFE film was obtained by extrusion and rolling in the same manner as in Example 1. Next, the resulting semi-sintered PTFE film was processed into a porous film in the same manner as in Example 1 except that the temperature of the uniaxial stretching, the temperature of the biaxial stretching, and the thermosetting temperature were changed as shown in Table 3. The physical properties were measured in the same manner as in Example 1. Table 3 shows the results. Further, a polymer electrolyte membrane was obtained in the same manner as in Example 1 except that the resulting porous film was used. Table 3 shows the results of evaluating the polymer electrolyte membrane.

Example 9

A non-sintered PTFE film was obtained by extrusion and rolling in the same manner as in Example 1. Next, a porous film was obtained by processing the resulting semi-sintered PTFE film in the same manner as in Example 1 except that the ratio and temperature of the uniaxial stretching and the conditions of the biaxial stretching were changed as shown in Table 3. The physical properties were measured in the same manner as in Example 1. Table 3 shows the results. Further, a polymer electrolyte membrane was obtained in the same manner as in Example 1 except that the resulting porous film was used. Table 3 shows the results of evaluating the polymer electrolyte membrane.

Example 10

1. Preparation of Electrode Catalyst Ink 1

First, 0.63 g of a 22.60 mass % perfluorosulfonic acid polymer aqueous solution (trade name: SS400C/20, product of Asahi Kasei E-materials Corp., EW=450), 1.36 g of a 20.86 mass % perfluorosulfonic acid polymer aqueous solution (trade name: SS700C/20, product of Asahi Kasei E-materials Corp., EW=740), and 9.97 g of ethanol were blended with 1.00 g of Pt on carbon (TEC10E40E, product of Tanaka Kikinzoku Kogyo K.K., Pt content: 37.0 mass %) serving as electrode catalyst particles (composite particles). The components were stirred using a homogenizer, and thereby a uniform electrode catalyst ink was obtained. The perfluorosulfonic acid polymer mixture contained in this electrode catalyst ink had an EW of 609. This electrode catalyst ink was treated as an electrode catalyst ink 1.

2. Preparation of Electrode Catalyst Ink 2

First, 2.04 g of a 20.86 mass % perfluorosulfonic acid polymer aqueous solution (trade name: SS700C/20, product of Asahi Kasei E-materials Corp., EW=740) and 9.92 g of ethanol were blended with 1.00 g of Pt on carbon (TEC10E40E, product of Tanaka Kikinzoku Kogyo K.K., Pt content: 37.0 mass %) serving as electrode catalyst particles (composite particles). The components were stirred using a homogenizer, and thereby a uniform electrode catalyst ink was obtained. This electrode catalyst ink was treated as an electrode catalyst ink 2.

The electrode catalyst ink 1 was applied to the polymer electrolyte disclosed in Example 1 such that the amount of platinum was 0.3 mg/cm². The application of the electrode catalyst ink was performed using a screen printer (LS-150, product of Newlong Seimitsu Kogyo Co., Ltd.) equipped with a 200-mesh screen (Nihon Mesh Kogyo Co., Ltd.). Next, the electrode catalyst ink 2 was applied to the opposite side of the electrolyte membrane by the same process such that the amount of platinum was 0.2 mg/cm². Then, the inks were dried at 140° C. for five minutes in the atmosphere, and thereby a membrane electrode assembly was obtained. The side of the membrane electrode assembly covered with the electrode catalyst ink 1 was mounted on the cathode and the side of the membrane electrode assembly covered with the electrode catalyst ink 2 was mounted on the anode, and a single cell was assembled with carbon paper (GDL35BC, SGL Group) that has a microporous layer being used as a gas diffusion layer. The power generation characteristics of the fuel cell were determined by the aforementioned determination method. The cell voltage under the high-humidity condition was 0.744 V and the cell voltage under the low-humidity condition was 0.730 V.

TABLE 3

| Parameter | | Unit | Example 5 | Example 6 | Example 7 | Reference Example 8 | Reference Example 9 |
|---|---|---|---|---|---|---|---|
| Extrusion | PTFE material | — | PTFE-D | PTFE-E | PTFE-F | PTFE-G | PTFE-H |
| | Extrusion aid | Parts by weight | 28 | 28 | 28 | 28 | 28 |
| | Extrusion pressure | MPa | 11.4 | 14.1 | 13.2 | 13.4 | 14.8 |
| Rolling | Average thickness | μm | 300 | 300 | 300 | 300 | 300 |
| Semi-sintering | Heat-treating temperature | °C. | — | — | — | — | — |
| | Treating time | Sec | — | — | — | — | — |
| Uniaxial stretching | Stretch ratio | Times | 15 | 15 | 15 | 15 | 10 |
| | Stretching rate | %/sec | 40 | 40 | 40 | 40 | 40 |
| | Stretching temperature | °C. | 300 | 300 | 300 | 300 | 300 |
| Biaxial stretching | Stretch ratio | Times | 43 | 43 | 43 | 43 | 30 |
| | Line speed | m/min | 10 | 10 | 10 | 10 | 10 |
| | Stretching temperature | °C. | 295 | 295 | 295 | 295 | 295 |
| | Heat-setting temperature | °C. | 340 | 340 | 340 | 340 | 340 |
| Physical properties of porous film | Grammage | g/m$^2$ | 1.41 | 1.88 | 1.84 | 1.55 | 1.55 |
| | Film density | g/cm$^3$ | 0.469 | 0.470 | 0.461 | 0.442 | 0.512 |
| | Film thickness | μm | 3.0 | 4.0 | 4.0 | 3.5 | 3.0 |
| | Matrix tensile strength (vertical) | MPa | 152 | 160 | 186 | 162 | 162 |
| | Matrix tensile strength (lateral) | MPa | 137 | 137 | 119 | 137 | 110 |
| | Product of Matrix tensile strengths (vertical × lateral) | $10^4 \times$ (MPa)$^2$ | 2.08 | 2.19 | 2.21 | 2.22 | 1.78 |
| | Average pore size | μm | 0.473 | 0.446 | 0.417 | 0.438 | 0.402 |
| Physical properties of electrolyte membrane | Vertical strength (Dry tensile (25°C., 50%)) | (MPa) | 31.7 | 40.3 | 39.9 | 38.5 | 36.2 |
| | Lateral strength (Dry tensile (25°C., 50%)) | (MPa) | 28.0 | 36.9 | 37.0 | 34.8 | 31.2 |
| | Vertical dimensional change (80°C., immersed in hot water) | (%) | 15.0 | 8.1 | 8.4 | 9.2 | 10.6 |
| | Lateral dimensional change (80°C., immersed in hot water) | (%) | 14.5 | 8.3 | 8.2 | 9.5 | 11.6 |
| | Membrane resistance | (mΩ) | 10.6 | 9.9 | 9.9 | 9.8 | 9.7 |

INDUSTRIAL APPLICABILITY

The polymer electrolyte membrane of the present invention can be suitably used as a solid polymer electrolyte membrane for polymer electrolyte fuel cells.

REFERENCE SIGNS LIST

1: Feeding roll for non-sintered film
2, 18: Take-up roll
3, 4, 5, 8, 9, 10, 11, 12: Roll
6, 7: Heat roll
13: Feeding roll for longitudinally stretched film
14: Pre-heating zone
15: Stretching zone
16: Heat-setting zone
17: Lamination roll

The invention claimed is:

1. A polymer electrolyte membrane comprising
a porous film having pores; and
a polymer electrolyte contained in the pores,
the porous film being obtained by copolymerizing tetrafluoroethylene and one or more ethylenic comonomers to provide polytetrafluoroethylene and then stretching the polytetrafluoroethylene,
the porous film having an average pore size of greater than 0.20 μm and a contact angle with a solution of the polymer electrolyte of smaller than 50 degrees,
wherein the polytetrafluoroethylene has non-melt-fabricability and includes 0.011 mol % or more and 0.050 mol % or less of a polymerized unit derived from the one or more ethylenic comonomers in all the monomer units wherein the ethylenic comonomer is perfluoro (methyl vinyl ether)
wherein the polymer electrolyte is a fluoropolymer electrolyte, wherein the fluoropolymer electrolyte is a copolymer comprising:
a repeating unit derived from a COOZ or SO$_3$Z group-containing monomer represented by the following formula (I):

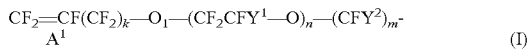

$$CF_2=CF(CF_2)_k-O_1-(CF_2CFY^1-O)_n-(CFY^2)_m-A^1 \quad (I)$$

wherein Y$^1$ is F, Cl, or a perfluoroalkyl group; k is an integer of 0 to 2; l is 0 or 1; n is an integer of 0 to 8, n Y$^1$s may be the same as or different from each other; Y$^2$ is F or Cl; m is an integer of 0 to 12, if m=0, l=0 and n=0, m Y$^2$s may be the same as or different from each other; A$^1$ is COOZ or SO$_3$Z, where Z is an alkali metal, an alkaline earth metal, hydrogen, or NR$^1$R$^2$R$^3$R$^4$, where R$^1$, R$^2$, R$^3$, and R$^4$ are each a C1-C3 alkyl group or hydrogen; and
a repeating unit derived from tetrafluoroethylene.

2. The polymer electrolyte membrane according to claim 1, wherein the polytetrafluoroethylene includes 0.025 mol % or more and 0.050 mol % or less of a polymerized unit derived from the ethylenic comonomer in all the monomer units.

3. The polymer electrolyte membrane according to claim 1, wherein the porous film has a product of vertical and lateral matrix tensile strengths of 2.20×10$^4$ MPa$^2$ or greater.

4. The polymer electrolyte membrane according to claim 1, wherein the porous film has a film density of 1.4 g/cm$^3$ or lower.

5. The polymer electrolyte membrane according to claim 1, wherein the porous film has a thickness of smaller than 20 μm.

6. The polymer electrolyte membrane according to claim 1, wherein the polytetrafluoroethylene has a standard specific gravity of 2.160 or lower.

7. A membrane electrode assembly comprising the polymer electrolyte membrane according to claim 1.

8. A polymer electrolyte fuel cell comprising the membrane electrode assembly according to claim 7.

* * * * *